Oct. 9, 1951  F. W. SEYBOLD  2,570,873
PAPER CUTTER

Filed May 31, 1946  12 Sheets-Sheet 1

INVENTOR.
FREDERICK W. SEYBOLD
BY
ATTORNEYS

Oct. 9, 1951  F. W. SEYBOLD  2,570,873
PAPER CUTTER
Filed May 31, 1946  12 Sheets-Sheet 2

INVENTOR.
FREDERICK W. SEYBOLD
BY
ATTORNEYS

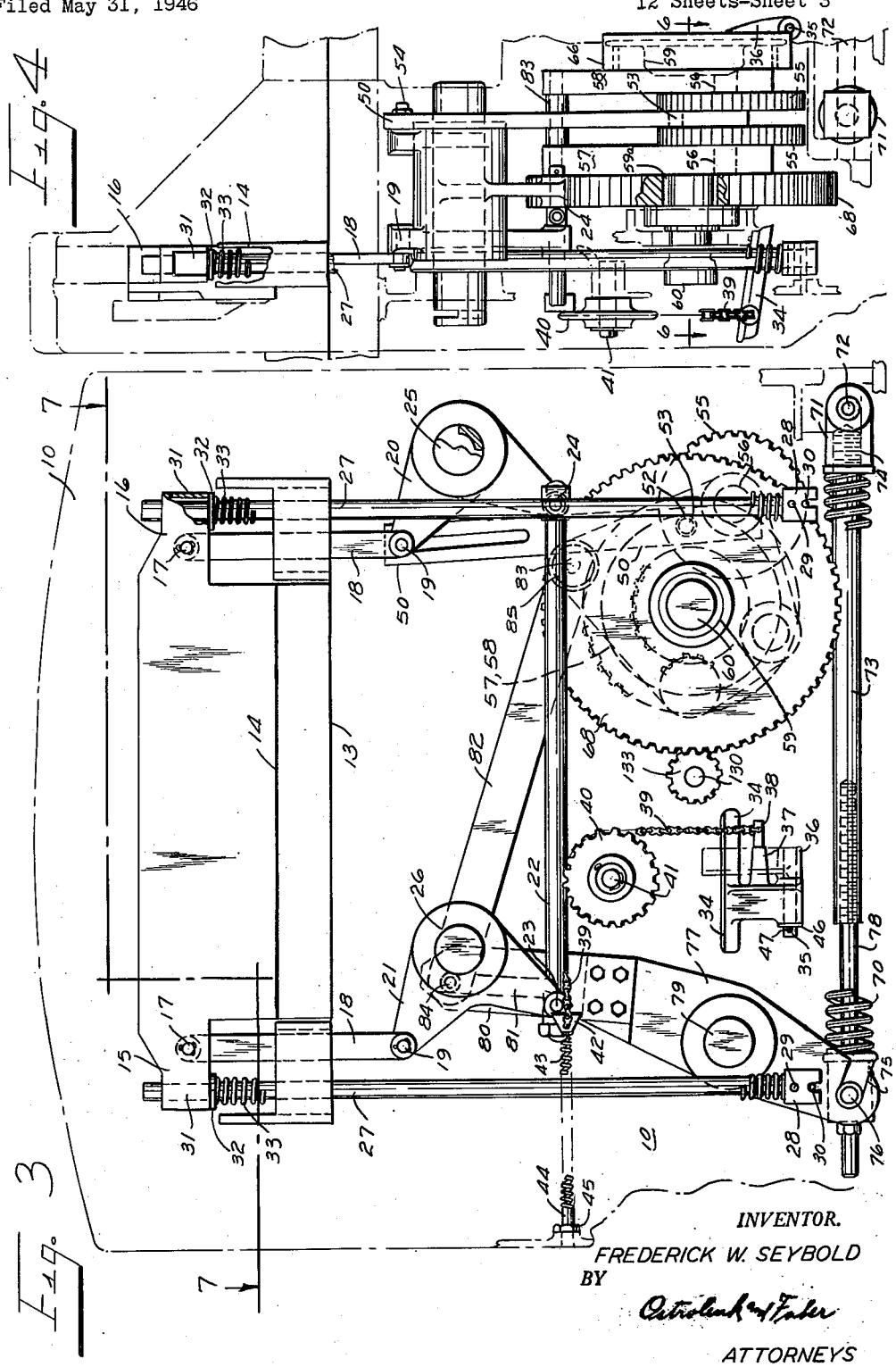

Oct. 9, 1951   F. W. SEYBOLD   2,570,873
PAPER CUTTER
Filed May 31, 1946   12 Sheets-Sheet 4
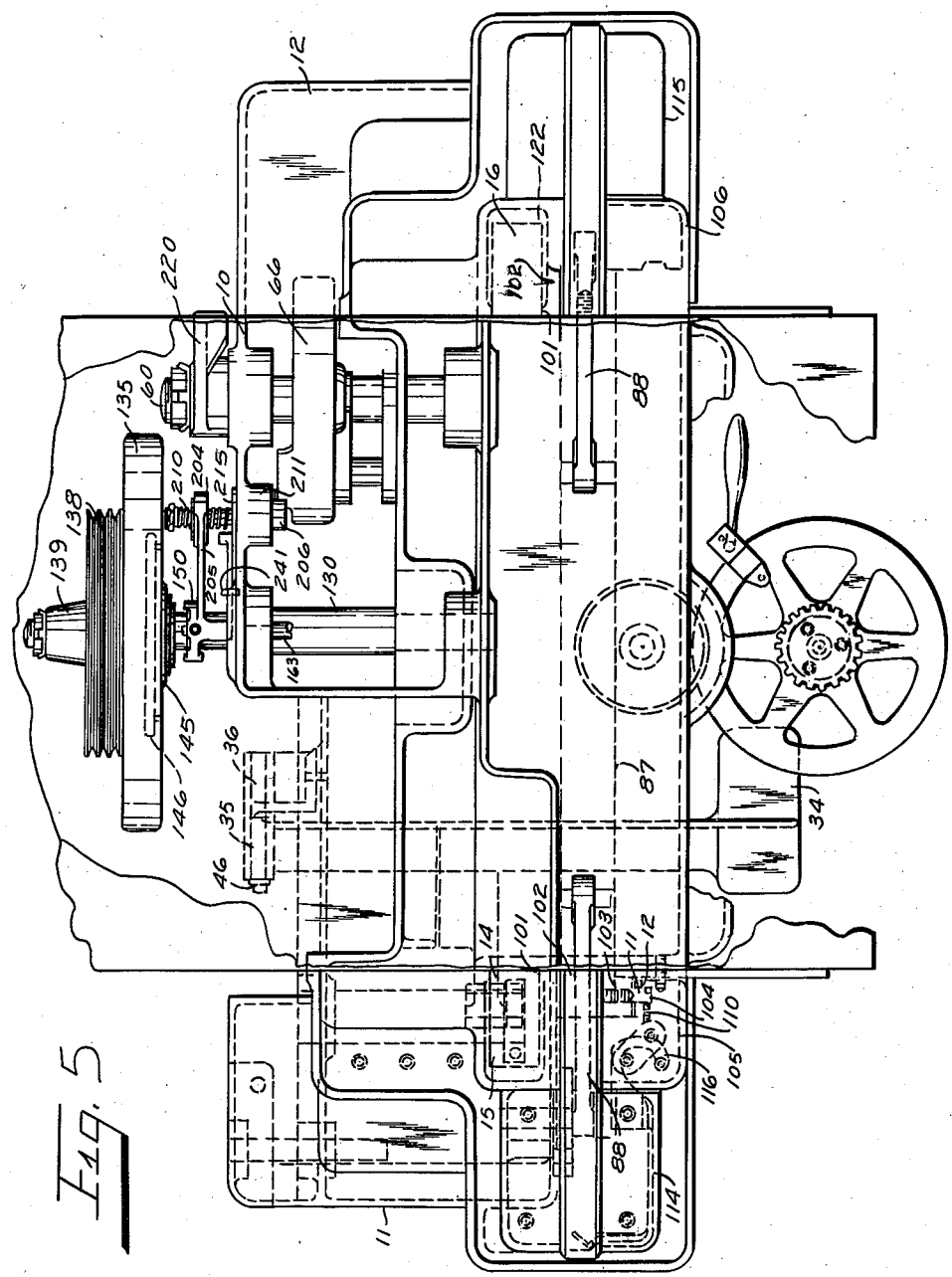
INVENTOR.
FREDERICK W. SEYBOLD
BY
ATTORNEYS

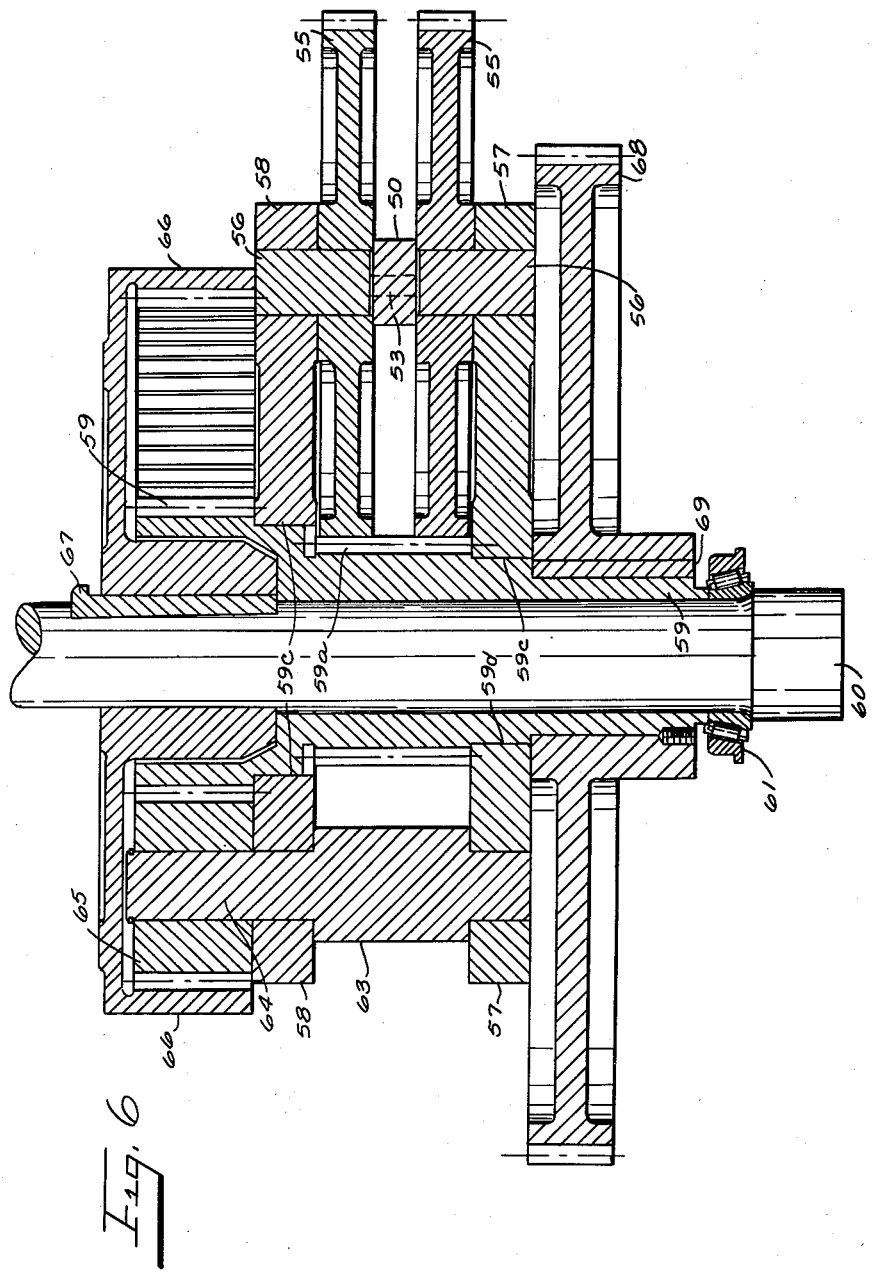

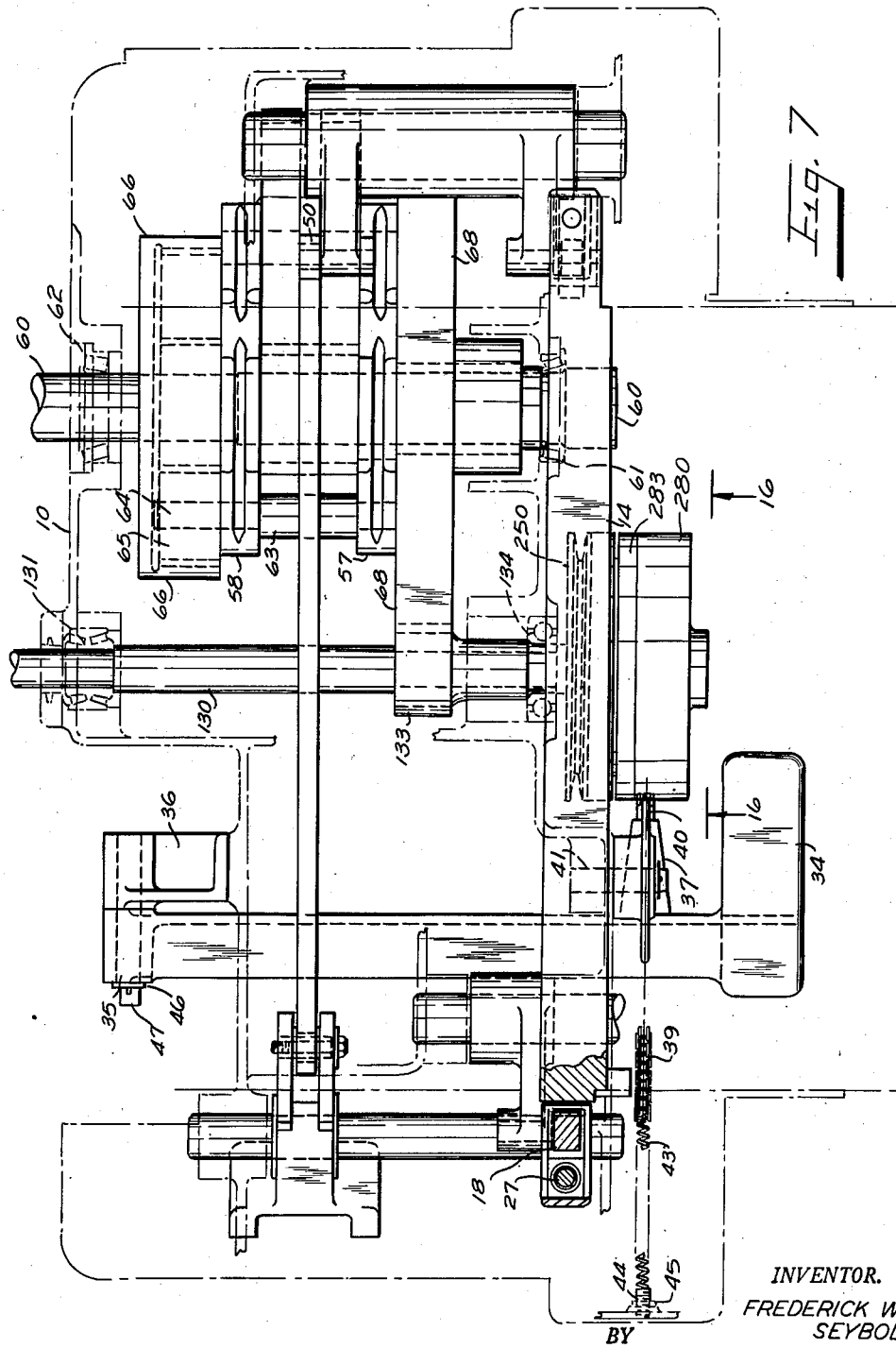

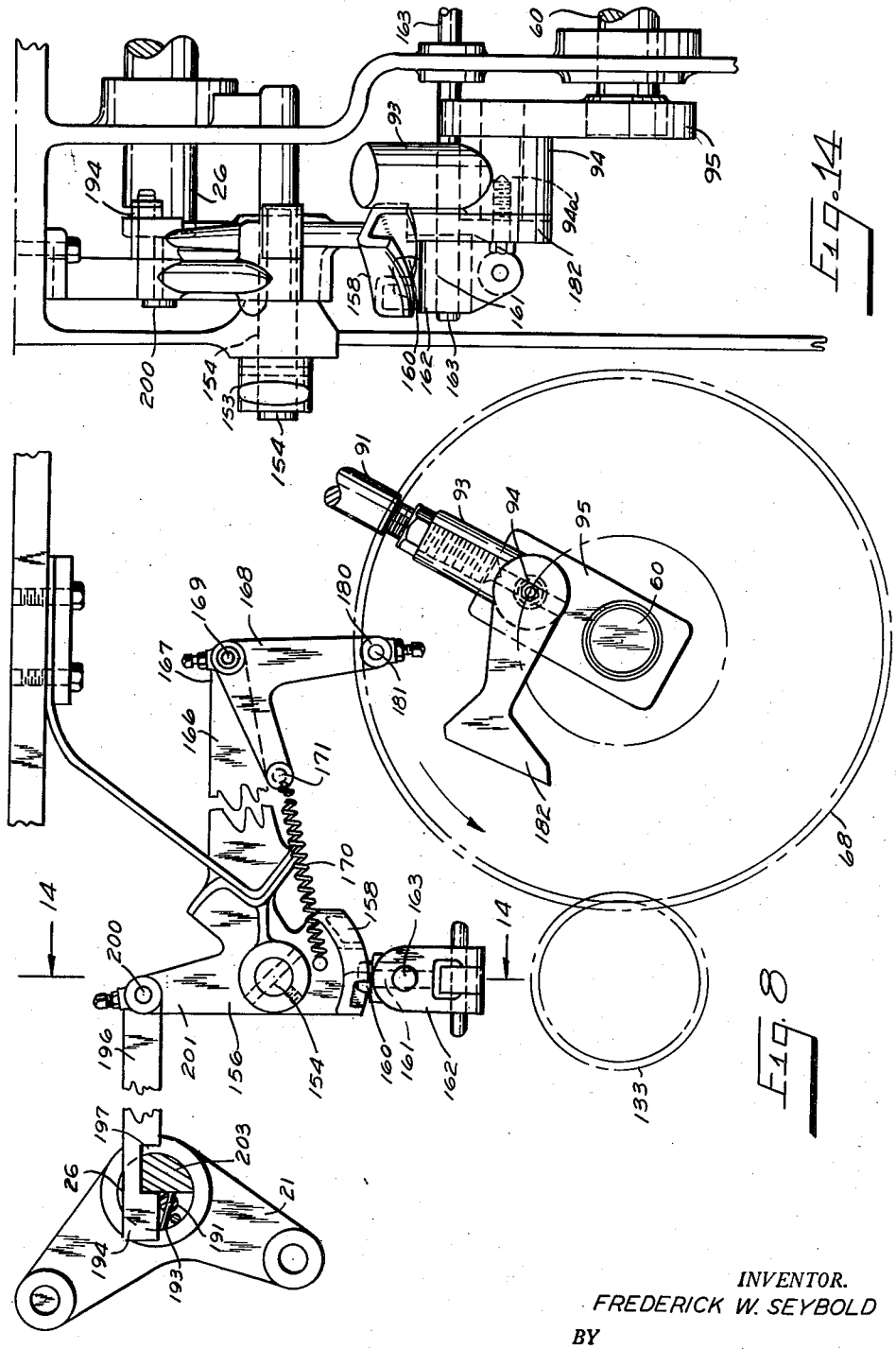

Oct. 9, 1951  F. W. SEYBOLD  2,570,873
PAPER CUTTER
Filed May 31, 1946  12 Sheets-Sheet 8
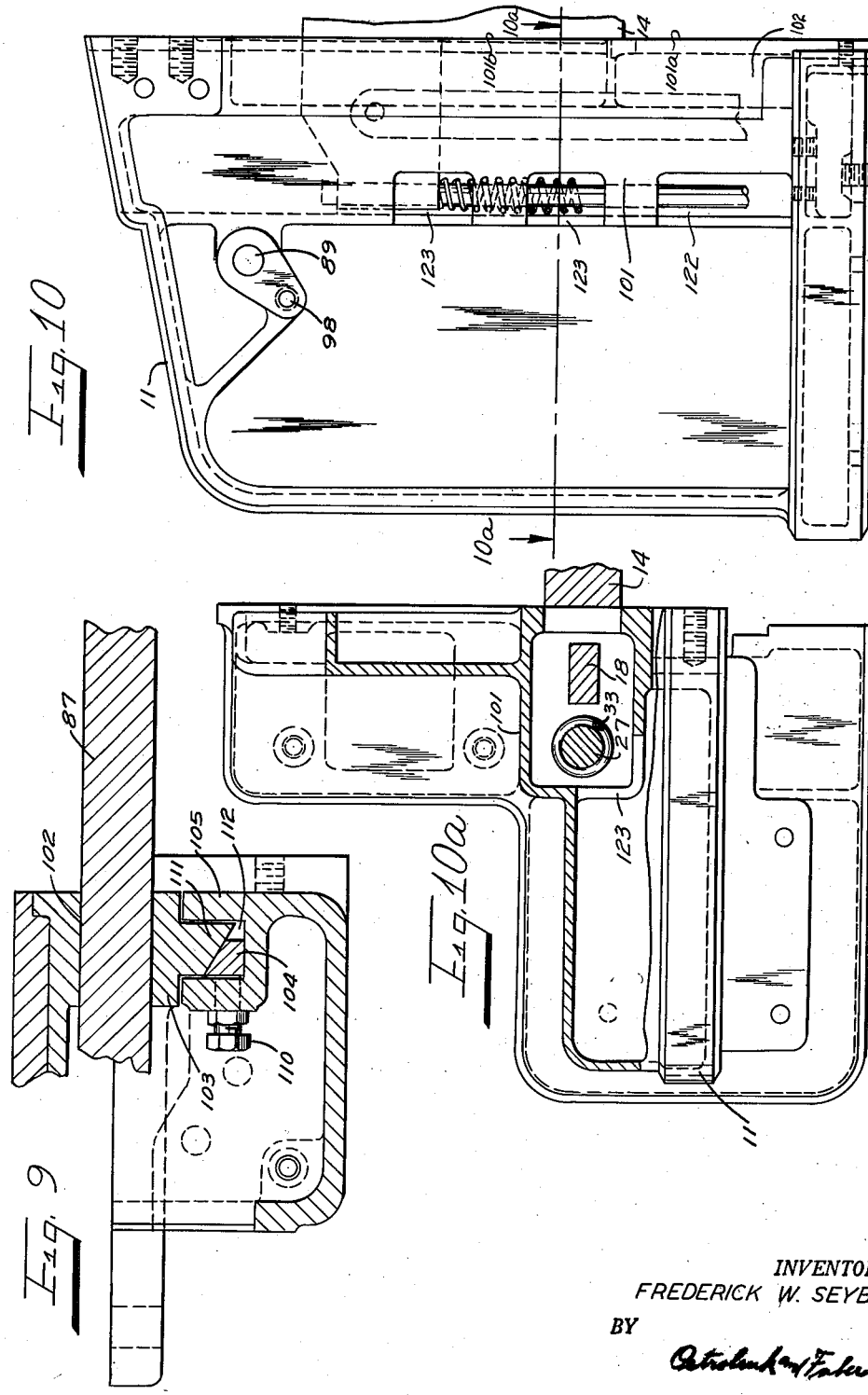
INVENTOR.
FREDERICK W. SEYBOLD
BY
ATTORNEYS Oct. 9, 1951
F. W. SEYBOLD
2,570,873
PAPER CUTTER
Filed May 31, 1946
12 Sheets-Sheet 9
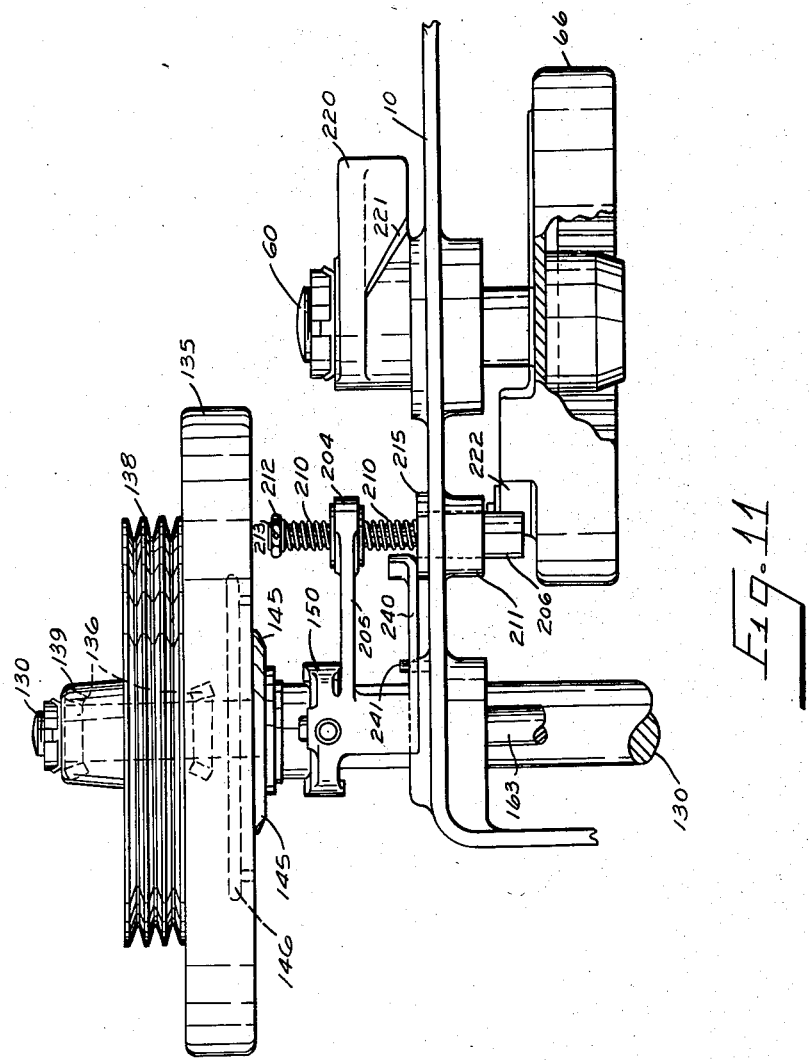
INVENTOR.
FREDERICK W. SEYBOLD
BY
ATTORNEYS Oct. 9, 1951  F. W. SEYBOLD  2,570,873
PAPER CUTTER
Filed May 31, 1946  12 Sheets-Sheet 10
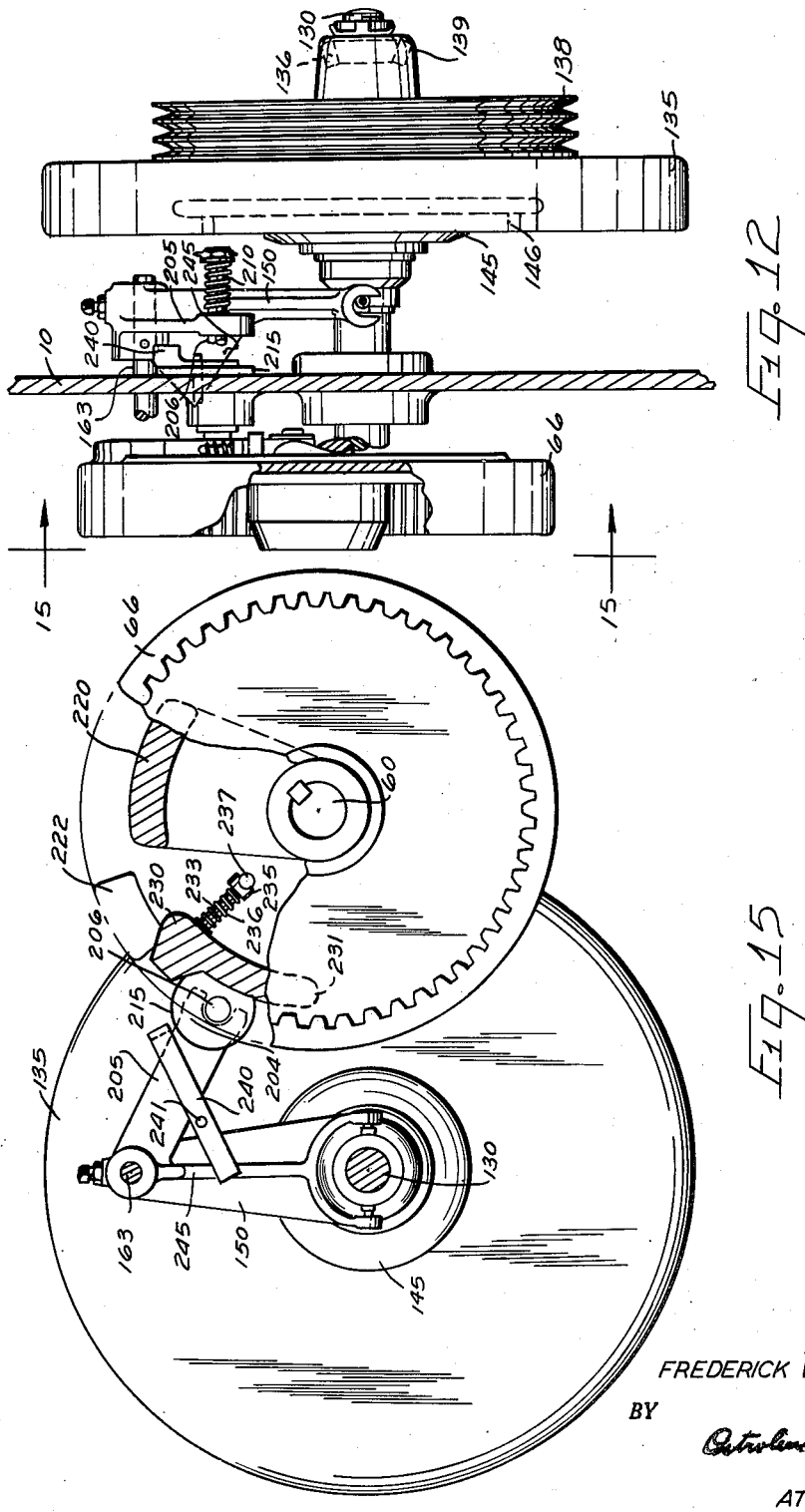
INVENTOR.
FREDERICK W. SEYBOLD
BY
ATTORNEYS

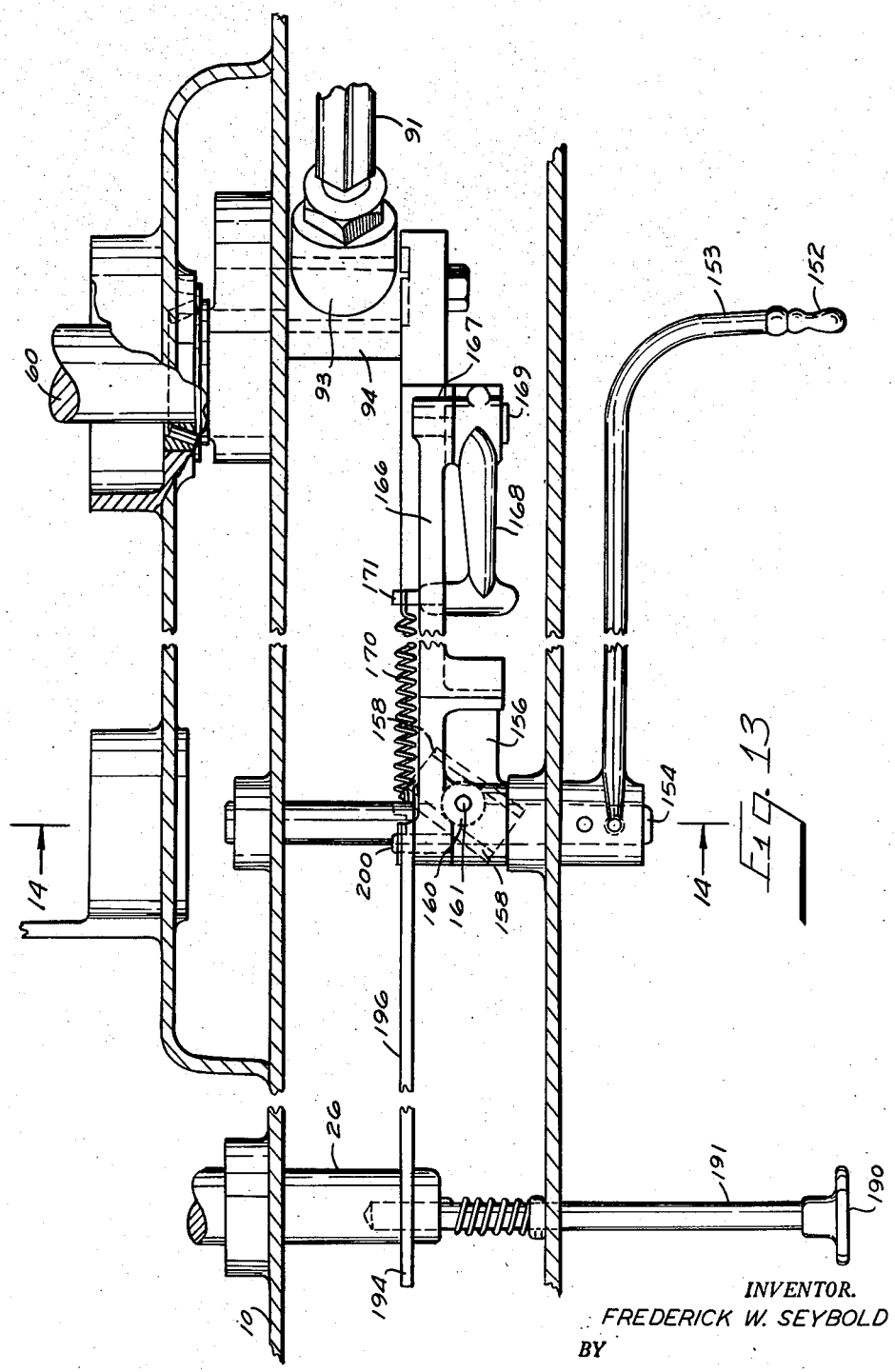

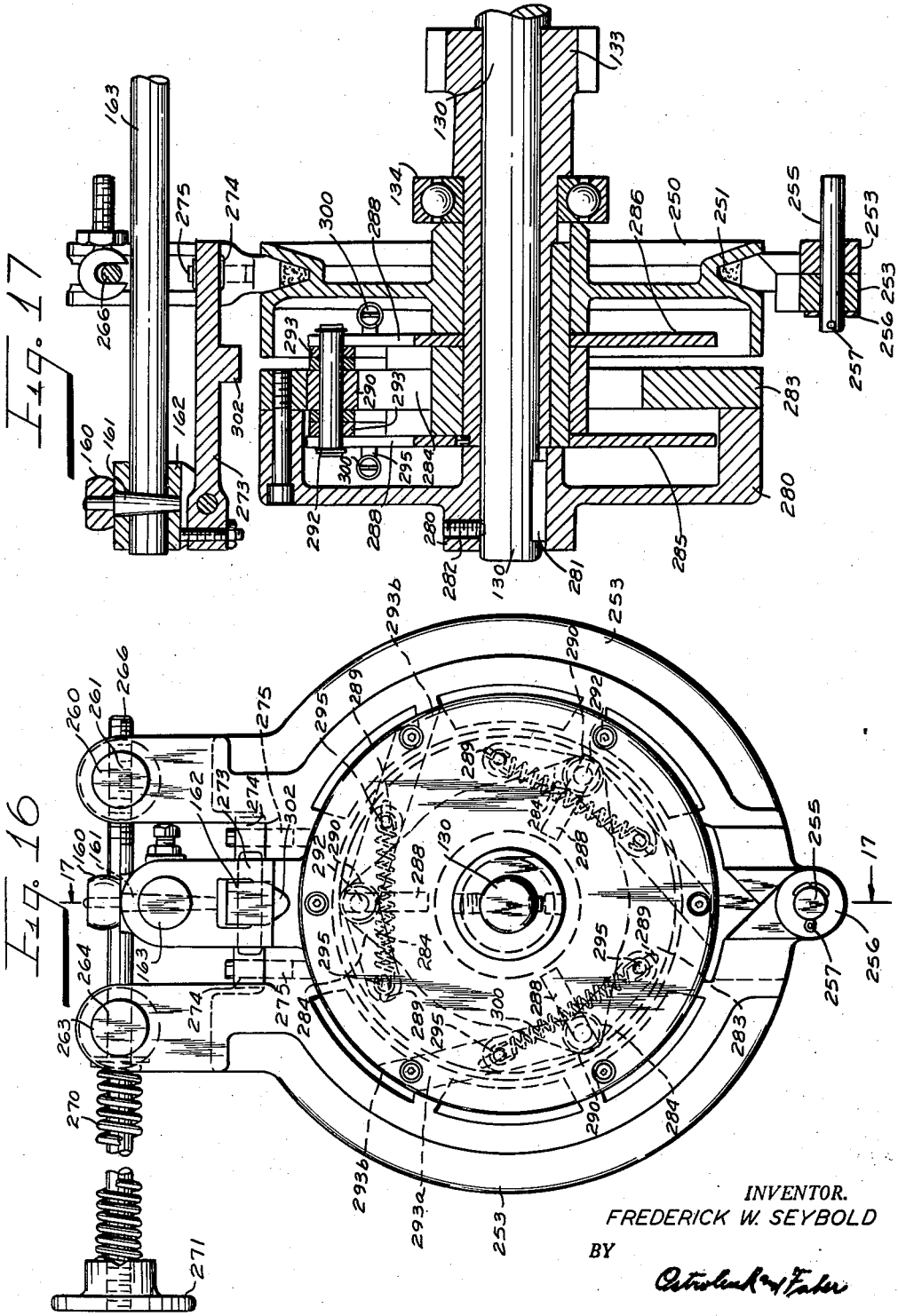

Patented Oct. 9, 1951

2,570,873

UNITED STATES PATENT OFFICE 2,570,873

PAPER CUTTER

Frederick W. Seybold, Westfield, N. J., assignor to E. P. Lawson Co., Inc., New York, N. Y., a corporation of New York Application May 31, 1946, Serial No. 673,289

57 Claims. (Cl. 164—54)

My present invention relates to paper cutting mechanisms and more particularly to a novel guillotine type paper cutter which includes a clamping mechanism, the pressure of which is controlled by the reactive force of the knife going through the paper stack. Since the clamping pressure is thus automatically controlled and therefore permits the continued use of the knife as it become duller, my cutting machine also includes a novel safety mechanism and an overload release device together with other elements facilitating the operation of the clamp and the knife.

Essentially in my cutting machine, my clamping mechanism derives the major portion of its clamping pressure from the resistance which the knife meets in cutting through the paper pile and the minor portion of the clamping pressure is derived from a compression spring.

Heretofore in the operation of cutting machines, particularly of the guillotine type, which utilize a clamp for compressing the paper stack just prior to the movement of the knife into the paper stack, clamping pressure was obtained primarily by a single compression spring or set of compression springs, the stored energy of which was utilized to force the clamp down. Also in some prior devices clamping pressure was obtained hydraulically or by friction devices.

Where, however, it was desired to make the clamping pressure adjustable, then means were provided for varying the amount of compression of these springs. These means included utilization of a number of such compression springs; one or more of which can be disconnected by the operator to reduce the clamping pressure or manually operated adjustments were provided to vary the compression of the clamping springs or the pressure of the hydraulic mechanism. All of these prior adjustments were made by the operator before cutting and were based on the operator's judgment or instructions.

The various factors which influence the desirable clamping pressure which is to be obtained are:

1. The height of the paper pile on the cutting table.
2. The nature of the stock in the pile, and
3. The relative sharpness of the knife.

In addition to these major factors, other minor factors such as variations in quality of the same stock, minute canting of the knife owing to wear and other elements well known in the art also influence the desirable clamping pressure.

While an operator may readily make an adjustment of clamping pressure with respect to the height of the pile and the general nature of the stock being cut following general instructions for this purpose, the prior art provided for the most part only a very rough adjustment for clamping pressure. A skilled operator might also make an adjustment for the relative sharpness of the knife based on his knowledge of the machine and the length of time the machine has been used since the knife was last sharpened, but this was a rule of thumb adjustment and such adjustment of the clamping pressure for this purpose was impossible where the adjustment simply consisted of using one, two or three springs to vary clamping pressure.

The primary object of my invention is the provision of clamping mechanism which will automatically and without the intervention of the operator or adjustment by him apply exactly the correct clamping pressure required for all of the conditions occurring at the time the cut is made.

A further object of my invention is the provision of clamping mechanism which will apply clamping pressure which is infinitely variable over a predetermined range and which will apply the proper clamping pressure in response to the conditions which occur at the time of the cut.

To carry out these objects, my invention provides for a compression spring which causes the clamp to apply an initial minimum clamping pressure to the stack.

My device is further arranged so that as the knife enters the stack and begins to go through it, the resistance encountered by the knife will increase the clamping pressure in accordance with said resistance. Thus no adjustment need be made by the operator in going from one type of stock to another type of stock or for variations in the height of the pile or for the dullness of the knife.

In fact, since the reactive force of the knife going through the paper is used to increase the clamping pressure, the knife may be continuously used until it has become very dull. Since the knife may become so dull that the reactive force of the knife on the clamp as the knife goes through the stack may become so great as to break some of the mechanism, a further object of my invention is the provision of a novel overload release device which will release the knife cutting mechanism in the event that the knife encounters too great a resistance going through the stack. This will protect the machine not only against excessive dullness of the knife, but also against any accidental binding or jamming that may occur and also against the accidental inclusion of improper material in a stack which is being cut.

Thus a further object of my invention, is the provision of novel clamping means which will apply proper clamping pressure independently of the judgment of the operator of the machine as to any of the variables involved.

A further object of my invention is the provision of novel safety mechanism.

Still another object of my invention is the provision of novel drive means for the clamp and for the knife.

A further object of my invention is the provision of novel guide means for the clamp which will protect the paper stack and the knife.

Still another object of my invention is the provision of novel adjusting and guide means for the knife.

These and many other objects of my invention will become apparent in the following description and drawings in which:

Figure 3 is a vertical front view showing the clamp operating mechanism.

Figure 4 is a vertical side view showing the clamp operating mechanism.

Figure 5 is a top view of the paper cutter showing the operating mechanism generally.

Figure 6 is a detail view in cross-section taken on line 6—6 of Figure 4 showing details of a portion of the clamp operating mechanism.

Figure 7 is a detail view corresponding to that of Figure 5 and taken on line 7—7 of Figure 3 showing further clamp operating details.

Figure 8 is a detail view of the throw-in and throw-out mechanism for operating the knife.

Figure 9 is a detail of the knife guide means and is an enlargement of a portion of Figure 5.

Figure 10 is a front elevation of the left-hand upright housing.

Figure 10a is a section taken on line 10a—10a of Figure 10.

Figure 11 is an enlarged detail view of a portion of Figure 5 showing the fly-wheel arrangement and clutch members.

Figure 12 is a further detail view of the mechanism of Figure 11.

Figure 13 is an enlarged detail showing additional clutch operating elements.

Figure 14 is an enlarged detail view taken from line 14—14 of Figure 13.

Figure 15 is a view taken on line 15—15 of Figure 12 looking in the direction of the arrows.

Figure 16 is a front view of the braking mechanism and overload release mechanism shown in the lower center of Figure 7 and taken on line 16—16 of Figure 7.

Figure 17 is a view taken on line 17—17 of Figure 16.

Figure 1:
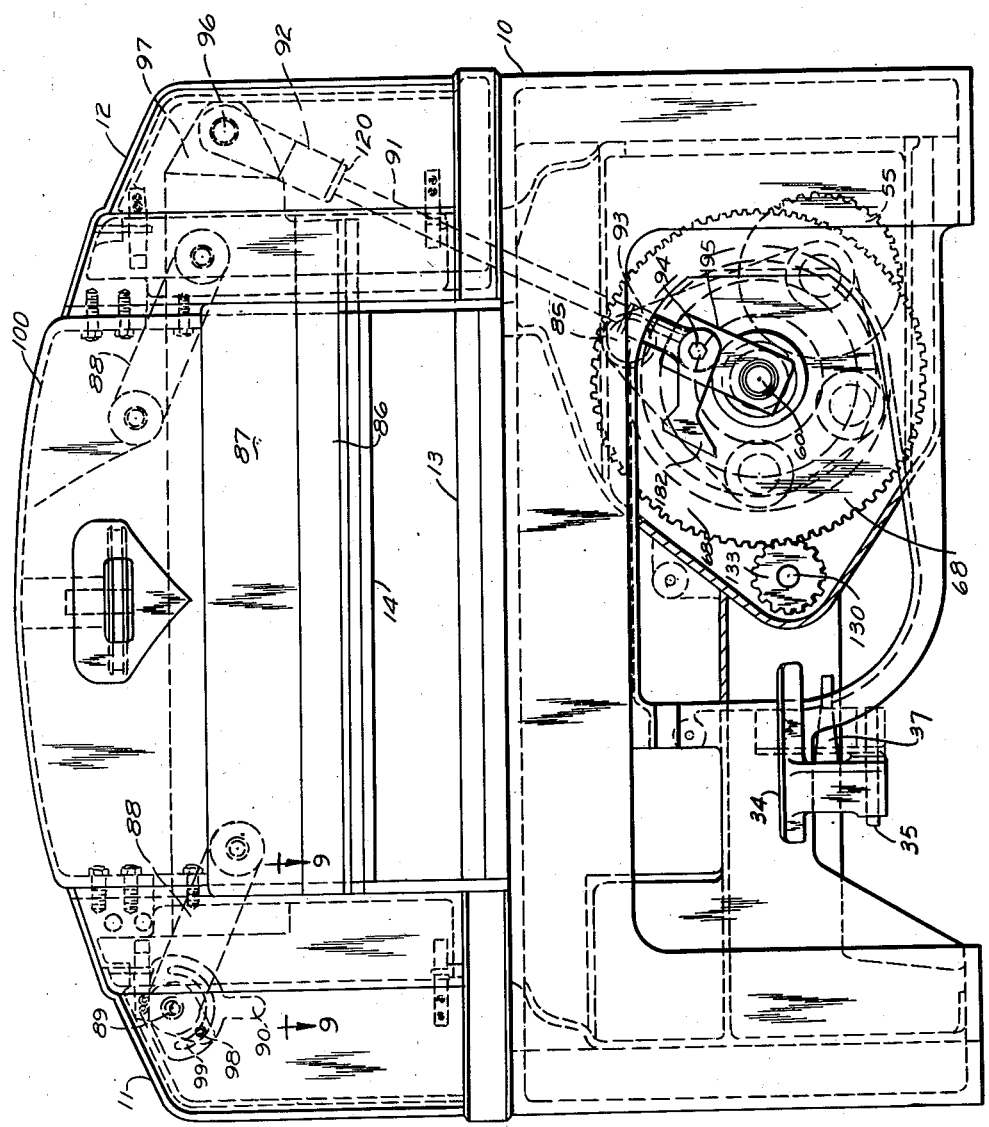
Figure 1 is a vertical general view partly broken away of my novel paper cutter.

Referring to Figure 1, the machine has a column casting 10 which contains and houses the driving mechanism. Two upright housings 11 and 12 are fastened on top of column 10. They are spaced apart a distance equal to the width of the table 13. This table is a support for the pile of paper to be cut.

Figure 2:
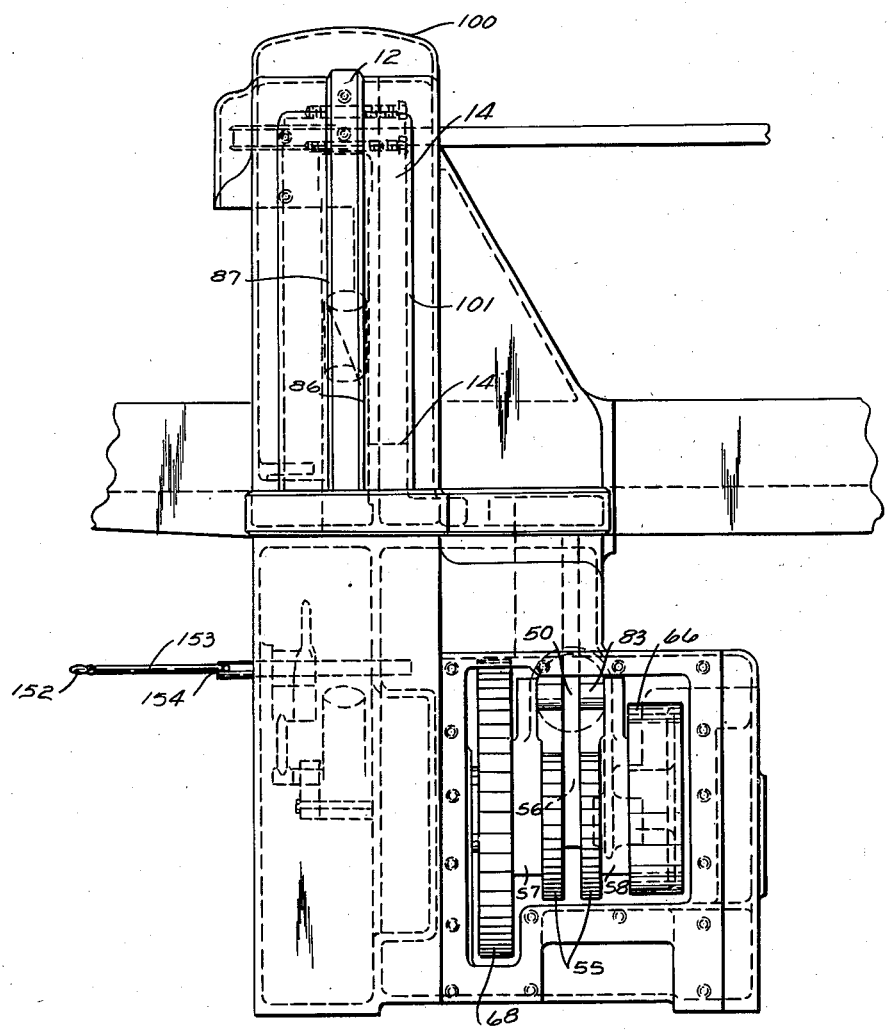
Figure 2 is a vertical side view partly broken away of my novel paper cutter.

In the following description, Figures 3 and 4 show primarily the clamping mechanism omitting the knife operating mechanism for the sake of clarity. The knife and knife operating mechanism are shown in Figures 1 and 2. The relationship in space and function of the clamp and knife members are shown in Figure 5 as well as in the common elements of Figures 1 to 7.

CLAMPING MECHANISM

The clamp 14 (Figures 3 and 4) is positioned approximately six inches above table 13. Clamp 14 is provided with extensions 15 and 16 to which on either side are connected, by means of pins 17, 17, the vertical pull bars 18, 18. These pull bars 18 are connected respectively at the lower ends to pins 19 of the bell cranks 20 and 21 on opposite sides. Bell cranks 20 and 21 are connected to the horizontal rod 22 by connecting pins 23 and 24 to keep the movement of the clamp 14 parallel to the table.

The bell crank 20 is free to oscillate on the shaft 25 and the bell crank 21 is free to oscillate on the shaft 26. These shafts are secured in the column casting 10.

In order to make it possible for the clamp 14 to be depressed or lowered toward the table by means of foot pressure, to be described later, the following mechanism is provided:

Referring to Figures 3 and 4, two vertical rods 27, 27 are connected to the swivels 28 by means of pins 29 and are supported on pins 30 which are fastened to column casting 10. The upper ends of rods 27, 27 pass through holes in the extensions 15 and 16 of the clamp 14. Washers 32 bear against the lower side of extensions 15 and 16. Springs 33, guided on rods 27, are compressed between the swivels 28 and the washers 32 and in this manner support the weight of the clamp 14 and return the clamp to its uppermost position when foot pressure is released.

PEDAL OPERATION OF CLAMP

Foot treadle 34 is fulcrumed on a pin 35 which is carried in a bracket 36 which is fastened to the column casting 10 (see also Figures 5 and 7). The treadle 34 is held in position on pin 35 by washer 46 and cotter pin 47. Foot treadle 34 has a boss 37 with a pin 38. A chain 39 is connected to pin 38, and this chain is run over a sprocket 40 which is free to turn on a pin 41, which in turn is fastened or driven into column casting 10. The other end of the chain 39 is connected to a block 42 which bears against the pin 23. The block 42 is also connected to one end of tension spring 43, the other end of which is secured to the adjusting stud 44 which is secured by means of the nut 45 to the column casting 10.

It can therefore be seen that when the foot depresses the treadle 34, the downward movement of said treadle will pull down chain 39 extending spring 43 and pushing block 42 against pin 23; this will therefore turn the bell crank 21 in a counterclockwise direction. Since bell crank 20 is connected by rod 22 to bell crank 21, it will also turn counterclockwise; bars 18 will thus be pulled down and clamp 14 will accordingly be moved downwardly toward the table 13. When pressure is released from the treadle 34, the springs 33 will again return the clamp 14 to its uppermost position; the tension spring 43 will at the same time return the chain 39 and the foot treadle 34 to its original upward position.

POWER OPERATION OF CLAMP

The vertically slotted link 50 is suspended from the bell crank 20 by pin 54 which passes through slot 51 in link 50. Pin 54 is mounted on bell crank lever 20 and is coaxial with pin 19. The lower end of link 50 carries a bore and needle bearing 52 which fits over the crank pin 53. Crank pin 53 is carried by the two clamp gears 55 (see Figures 3 and 4 and especially Figure 6) which turn on the short shafts 56. Shafts 56 are secured to the plates 57 and 58.

Plates 57 and 58 are free to turn on bearings 59d, 59c provided on the long double pinion 59. Pinion 59 is free to rotate on the crank shaft 60 which is journalled on Timken bearings 61 and 62 (see also Figure 7) which are fitted into bores provided in the column casting 10. The plates 57 and 58 are spaced apart by shouldered shaft 63 and this shaft has an extension 64 on which the pinion 65 can turn freely. This pinion 65 meshes with the long double pinion 59 and the internal gear 66, the latter being keyed to the crank shaft 60 by means of the nose key 67.

The large gear 68 is keyed to the double pinion 59 by means of the key 69. The clamp gears 55 mesh with the smaller diameter teeth 59a on the double pinion 59.

When the large gear 68 is rotated by the apparatus hereinafter described, it will drive the double pinion 59 which will in turn operate the clamp gears 55, and the crank pin 53 will then pull on the vertical bar 50 and turn the bell cranks 20 and 21 so as to depress the clamp 14 until the clamp contacts a pile of paper which has been placed on the table 13.

After contact has been made with the paper pile, the rotation of the bell cranks 20 and 21 will cease but the clamp gears 55 will continue to rotate in response to further rotation of gear 68 and pinion 59 with the result that the plates 57 and 58, on which gears 55 are mounted, will commence to turn about their bearings 59d and 59c on the long double pinion 59. This rocking movement of the plates 57 and 58 will continue until the crank pin 53 will pass through an extended line drawn from the pin 54 (which is coaxial with pin 19 in the bell crank 20) through the center of short shaft 56.

Thereafter on continued rotation of gear 68 through its full cycle the plates 57 and 58 will return to their original position and then the continued turning of the clamp gears 55 will return the pull bar 50 to its uppermost original position and the clamp 14 will also be returned to its uppermost position due to the pressure of the springs 33.

The movement in a counterclockwise direction, with respect to Figure 3, of the plates 57 and 58 is resisted by a large compression spring 70 (Figure 3) which is located across the lowermost part of the column casting 10. One end of the large compression spring 70 bears against the pivot 71 which is suspended from the pin 72, the latter being secured in the column casting 10.

A guide rod 73 is threaded into the pivot 71 at 74 and serves to support the coils of the spring 70. The other end of the large compression spring 70 bears against a pivot 75 and this pivot is provided with trunnions 76. The latter are fulcrummed in the lowermost end of the rocking arm 77.

A bolt 78 passes through the bore in the pivot 75 and is threaded into the guide rod 73. The rocking arm 77 is fulcrummed on the shaft 79 and the upper end of the rocking arm 77 is provided with plates 80 having slots 81. A connecting rod 82 connects the rocking arm 77 with the plates 57 and 58 by means of the pin 83 and the needle bearing 85; the opposite end of rod 82 being connected by pin 84 to slots 81 in plates 80.

It can therefore be seen that when the plates 57 and 58 are compelled to turn in a counterclockwise direction, the arm 77 will rotate counterclockwise around shaft 79 and drive trunnions 76 and pivot 75 to the right to compress the large compression spring 70. The amount of effort required to do this will be derived from the crank pin 53 and consequently to the pull bar 50 which pulls on the pin 54 in the upper end of the bell crank 20.

In other words, assuming that a pile of paper about 3 inches high has been placed on the table 13 and the clamp gears 55 rotate counterclockwise, the clamp will be pulled downwardly by means of the pull bar 50 acting on the bell crank 20. When the clamp contacts the pile of paper, the remainder of the crank throw of the crank pin 53 then compels the counterclockwise rotation of the plates 57 and 58 and through this movement of these plates and the action of the connecting rod 82 acting on the rocking arm 77 compresses the large spring 70; the reaction from this expended torque is passed on to the pin 19 in the bell crank 20 to press clamp 14 on to the pile of paper resting on table 13.

This initial pressure exerted on the clamp 14 will squeeze out the air contained in the paper pile and securely hold the paper until the knife begins to cut into the pile.

REACTION OPERATION OF CLAMP

It will, of course, require power to force the knife through this pile of paper. The driving power for the knife is derived from large gear 68 which rotates pinion 59. Power is transmitted from pinion 59 through planetary gear 65 to internal gear 66. Internal gear 66 is keyed to and drives the crank shaft 60 which drives the knife elements as hereinafter described.

Therefore, the driving torque reaction for the knife is taken by the shaft 63, which carries planetary gear 65 on its extension 64. Since the plates 57 and 58 carry the shaft 63, this reaction will also tend to oppose the movement of the plates 57 and 58; the more resistance that the knife meets in its cutting operation, the more this reaction on the pin 63 will be increased and the more will the motion of the plates 57 and 58 be further opposed. This therefore augments the force derived from the large compression spring 70 and increases the clamping pressure in proportion to the resistance that the knife meets in its cutting operation.

In other words, the harder the knife must work to go through the paper pile, the greater will be the reaction force on the clamping mechanism to increase clamping pressure. The duller the knife gets, the more clamping pressure is required; and this is supplied through my novel reaction mechanism. Therefore, the clamping pressure automatically adjusts itself to the dullness or sharpness of the knife.

Thus, only a portion of the clamping pressure is actually derived from spring 70. As requirements for clamping pressure increase owing to dulling of the knife, the greater resistance offered to the knife in cutting will automatically increase the applied clamping pressure. This avoids the necessity for using two or three springs of the type 70 which would also have to be adjusted to the pressure requirements. My novel construction thus automatically adjusts the pressure to the dullness or sharpness of the knife.

Also it is known that different grades of paper are easier to cut than others with the same sharpness or dullness of the knife, and consequently the pressure is always equal to that required in order to hold the paper securely without any adjustments of any kind on the spring or anywhere else. If the type of paper to be cut is changed, there would have to be more tension on the springs whereas in my novel device such adjustments are not necessary.

My invention therefore avoids the necessity for complex and frequent minute adjustments for various paper stocks and for progressive variations in the sharpness or dullness of the knife and the resistance offered by the stock to the knife.

The operator is thus not required to make an estimate based only on his own judgment as to the amount of clamping pressure required for each operation. This is automatically done by the reaction to the force required to move the knife through the paper, the greater the force on the knife, the greater the reactive force resulting in greater clamping pressure.

Some adjustment, however, is provided on the rocking arm 77. It has been mentioned that these plates are slotted and this makes it possible to move the pin and bearing 84 downwardly so that the amount of leverage is more favorable; that is, the amount of pressure transferred to the clamp 14 from the action of the compression spring 70 will be more. This adjusts only the initial squeeze, i. e. the effect of compression spring 70.

The clamping pressure as a result of the resistance offered to the movement of the knife is not adjustable but is nevertheless automatically increased in proportion to the resistance offered to the knife movement. The total pressure is, of course, the sum of the pressure of spring 70 and the resistance to the knife movement so that decreasing the effect of pressure offered by spring 70 decreases the total pressure applied to the paper.

CUTTING KNIFE CONSTRUCTION

The knife 86 (Figures 1 and 2) is secured by means of a series of screws to the knife bar casting 87, and the latter is suspended on links 88, one at each end (see also Figure 5). The link 88 on the left-hand side is suspended from an eccentric pin 89. Pin 89 is journalled in the housing 11. An arm 90 is fastened to eccentric pin 89 whereby when arm 90 is turned, the eccentric pin 89 will move the left end of the left-hand link 88 up or down.

As the knife width is reduced through repeated grinding and sharpening, eccentric pin 89 is used for adjusting the knife so that it will just cut through the last sheet of paper.

The problem here is to maintain the knife blade always parallel to the cutting stick in a groove of table 13 so that an adjustment of only one end of the knife blade is necessary for this purpose. The adjustment of the knife in the left-hand side is controlled by this eccentric pin 89 whereas the levelling of the knife on the right-hand side is obtained by the lengthening or shortening of the pull bar 91 which is provided with right and left-hand threads at its opposite ends threaded into the pivots 92 at its upper end and 93 at its lower end. The pivot 93 is fitted over crank pin 94 on crank 95, this crank being part of the crank shaft 60 (see also Figure 8). The pivot 92 is secured by means of the pin 96 to the upper right-hand extension 97 of the knife bar 87.

Therefore, when the crank shaft 60 rotates, the knife bar 87 will descend toward the table. Since it is pivoted on the two links 88, it will make a swinging movement toward the cutting stick in the table. The pull bar 91 is adjusted to the proper length so that the right-hand end of the knife will just cut through the last sheet of paper and the eccentric pin 89 is adjusted such that the left-hand end of the knife will also just cut through the last sheet of paper.

After the left link 88 has been properly adjusted on the left-hand side by means of the arm 90, the eccentric pin is then securely locked by a nut on the stud 98 affixed to housing 11. Stud 98 projects through a circular slot 99 of the arm 90. This slot 99 extends approximately over an arc of 180° so that the entire throw of the eccentric pin 89 becomes available.

The housings 11 and 12 are connected by means of the upper beam casting 100 whereby a rigid arched construction is provided for the reciprocation of the knife bar casting 87 as well as for the clamp 14. This beam 100, of course, must be strong enough to resist the upward push of the links 88 whenever the knife cuts through the paper.

GUIDE MEMBERS

Guide members for clamp

Referring now to Figures 5, 10 and 10a, the extensions 15 and 16 of the clamp 14 are guided in vertical guides 101 in the housings 11 and 12. Only the left-hand housing is shown in Figures 10 and 10a. The opposite guides have the same construction.

Each of the guides 101 is a rectangular tube-like member which is enclosed on all four sides, the side 101a directed toward the paper stack extending from the bed 13 of the machine to a distance above the bed slightly lower than the lowest edge of clamp 14 when the clamp is fully raised; the remaining sides of guide 101 extend to the top of the housing 11. The portion of guide 101 above wall 101a is open at 101b to permit extensions 15 to pass into the guide 101 and move up and down therein. Guide 101 receives pull bar 18 as well as spring 33 and its guide rod 27. Wall 101a prevents the pull bar 18 from contacting and disturbing or smearing the paper stack. Guide 101 on each side is provided with openings 122 and 123, 123 to permit inspection of the operation of pull bars 18 and springs 33.

Guide members for knife

The knife bar 87 (Figure 9) is guided between the ways 102 which are part of the housings 11 and 12 and the ways 103 which are adjustable by means of the wedge 104 in the housing cap 105 on the left-hand side and the housing cap 106 on the right-hand side (see Figures 5 and 9). Only the adjustment on the left-hand side is shown since the two sides are similar.

This adjustment is provided for the take-up of wear so the knife bar will always be a good fit in the ways 102. Screws 110 are provided on each side which bear against the wedges 104 on each side; by tightening the screws 110, the wedges will force the guides 103 against the knife bar 87. The guides 103 are T-shaped and the vertical part 111 of the T is guided in a groove or recess 112 of the housing caps 105 and 106 on each side.

Housings 11 and 12 are provided with doors 114 and 115 on hinges 116. Opening door 115 permits access to lock nut 120 on pull bar 91 to adjust the pull bar length. Opening door 114 permits access to handle 90 to adjust eccentric pin 89 as well as wedge 104.

DRIVING MECHANISM

A drive shaft 130 (Figures 1, 3, 5 and especially 7) is mounted at one end in the Timken bearings 131, the latter being inserted in a bore in the column casting 10. The other end of the drive shaft 130 is journalled in the long pinion 133, the head of which is provided with a ball bearing 134 mounted in a bore of the column casting 10. The pinion 133 meshes with the large gear 68 and whenever the drive shaft 130 rotates, it brings into motion the train of gearing described above for operating the clamp and the knife.

CLUTCH OPERATION

A fly-wheel 135 (Figures 5 and 11) is mounted on ball bearings 136 around drive shaft 130 and this fly-wheel is free to rotate on these bearings. Fly-wheel 135 is driven by V-belts from a motor, not shown, engaging pulley 138 on extension 139 of the fly-wheel 135. A multiple disc clutch 145 (commercially available), the driving friction plates of which fit into internal gear teeth 146 shaped into the fly-wheel is provided to connect the rotating fly-wheel 135 to the drive shaft 130; that is, whenever the clutch is engaged, the fly-wheel 135 then begins to drive the shaft 130 (see Figures 5, 11 and 12).

The clutch is engaged by the shifting of the lever 150 toward the fly-wheel 135. This operation is performed as shown in Figure 13 by depressing the handle 152 on the lever 153. Lever 153 is pinned to the short shaft 154 on which is fastened the lever 156. Lever 156 is provided at its lower end with an inclined closed cam groove 158 (Figures 13 and 14) into which the barrel-shaped roller 160 engages or projects. Roller 160 turns on a pin 161 which secures the short bracket 162 to the shaft 163 to which the lever 150 is also secured.

Therefore, when the lever 153 is depressed, the lever 156 and its cam 158 will act through the roller 160 to move the shaft 163 axially toward the fly-wheel 135 and engage the clutch elements 145 thereby connecting the fly-wheel with the shaft 130.

The lever 156 has an arm 166 extending toward the right and at its extremity 167 is suspended the bell crank 168 on the pin 169 and an extension spring 170 tends to hold the pin 171 which is secured to one end of the bell crank 168 against the extending arm 166 of the lever 156 (Figure 13 and especially Figure 8).

On the other end of the bell crank lever 168 is secured a roller 180 on the pin 181. On the crank pin 94 of crank 95 (Figure 8) is secured a throw-out arm 182 which will contact the roller 181 near the end of its rotary movement and will strike against the roller 181 near the completion of the cutting stroke so as to return the levers 153 and 156 to their uppermost position and thereby disengage the clutch. Crank 95 is keyed to the crank shaft 69 or is actually welded thereon, and the crank pin 94a is pressed into the crank 95; the clutch throw-out piece 182 is secured to the crank pin 94a so as to move therewith but is not rotatable with respect thereto.

*Two hand throw-in mechanism for clutch operation*

In order to protect the hands of the operator, some State laws require the operator to use both hands for the engagement of the clutch so that both of his hands are occupied at least during the beginning of the downward movement of the knife and the following mechanism is provided.

While the right hand is grasping the handle 152 (Figure 13), his left hand will take hold of the knob 190 and give it a slight clockwise movement. This will turn the shaft 191 (Figure 13 and especially 8) into which a small pin 193 is inserted. This pin rests against the outer end 194 of the bottom of the link 196 having notch 197. The opposite end of link 196 is pivoted on pin 200 of arm 201 of the lever 156.

The shaft 26 on which the bell crank 21 freely rotates is provided with a 90° ledge 203 with which the notch 197 of the link 196 engages. When the knob 190 is turned in a clockwise direction, the pin 193 will lift the link 196 out of engagement with the ledge 203 and thereby permit the operator to depress the lever 153 for the normal engagement of the clutch. Crank shaft 60 may now rotate to operate the knife and clamp mechanism. But on completion of the cycle member 182 will strike roller 180 on bell crank 168 carried by lever 156 and will rotate lever 156 counterclockwise about its pivot 154 to reset notch 197 of link 196 on ledge 203 to prevent a repeat operation.

*Safety pin mechanism to prevent repeat operation*

The arm 150 is provided with the integral extension 205 (Figures 11, 12 and 15) the end of which is forked at 204 to straddle the safety pin 206 which projects into a bore 211 of the column casting 10. Springs 210 on either side of the forked extension 204 locates the pin 206 by means of the nut 212 and cotter pin 213. A disc 215 is fastened to the safety pin 206. To the outermost end of the crank shaft 60 is secured the cam 220 having inclined surface 221, and when the clutch is engaged, the safety pin 206 moves toward the fly-wheel and is thereby withdrawn from a collision with the lug 222 on the internal gear 66, but after the internal gear has rotated through approximately 90°, the inclined surface 221 of the cam 220 will contact the disc 215 and push the safety pin 206 back in again so that should the internal gear 66 commence to make a second revolution, the lug 222 will strike against the safety pin 206 and thereby prevent any further turning of the internal gear 66 which of course means the stoppage of the movement of the knife.

When the operator is in the process of attaching a new knife or removing a dull one, he resorts to what is known as inching the machine; that is, he throws the clutch in by hand and throws it out quickly again and in so doing, he may reach a point whereby the projection or lug 222 would still coast on to the safety pin and thereafter prevent him from re-engaging the clutch again because the safety pin could not then be withdrawn. In order to avoid such a possibility, the arm 230 is provided. This arm is pivoted on the pin 231 which is fastened to the internal gear 66 and this arm 230 is urged against the lug 222 by the spring 233. Spring 233 presses against the shoulder 235 of the spring guide pin 236 which rests against the pin 237 also fast in the internal gear.

So while the operator is inching the machine over its range of motion whenever the safety pin is withdrawn, the arm 230 will then prevent the safety pin from moving inwardly so that the operator can inch the machine over the range when the lug 222 is approaching the safety pin.

After the cam 220, having rather a short surface, has pushed the safety pin 206 in by acting on the disc 215, the latter is held in this inward position by the latch 240 which drops in behind the disc 215 and thereby holds the safety pin 206 in its innermost position. The latch 240 is fulcrumed on pin 241 fastened in column 10. The cam face 245 is provided on the lever 150 so that when the clutch is thrown out, this cam 245 will contact the tail of latch 240 and unlock the disc 215 on the safety pin 206 so that on the next engagement of the clutch, the pin 206 can be withdrawn.

BRAKE MECHANISM

Referring now to Figures 16 and 17, the long driving pinion 133 which is free to turn on the drive shaft 130 has secured to it the brake wheel 250 of the V type having the annular V groove 251. Two brake shoes 253 are pivoted on the pin 255 which is secured to the column casting 10 and these brake shoes are held in place by washer 256 and cotter pin 257. The upper end of the right-hand brake shoe is provided with a pin 260 having a threaded opening 261 and the left-hand brake shoe has at its upper end a pin 263 with a drilled smooth hole 264 through which the brake tightening rod 266 passes; the threaded end of rod 266 screws into the opening 261 in pin 260.

A spring 270 has one end pressing against the upper end of the left-hand brake shoe 253 and the other end of the spring pressing against the knob 271 which is fastened to the brake tightening rod 266. The amount of braking force is therefore controlled by the amount of tension that is applied to the compression spring 270.

Suspended or hinged from the member 162 which carries the barrel-shaped roller 160 on the pin 161 as previously described, the brake spreading arm 273 contacts the rollers 274 free to turn on pin 275 and secured in each of the brake shoes 253 so that when the clutch is engaged, that is, when the shaft 163 is moved to the right, the cam surfaces on the brake spreader 273 will force the brake shoes out of engagement with the brake wheel so that the brake is released upon engagement of the clutch; and the brake is re-engaged when the shaft 163 moves to the left, that is, when the clutch is being disengaged.

OVERLOAD RELEASE MECHANISM

Because the clamping pressure is dependent upon the resistance that the knife meets in its cutting movement, the amount of power eventually required as the knife gets dull correspondingly increases and would then overload the driving gears to such an extent that breakage may result. In order to avoid this, an overload device is provided which consists of the driving drum 280, which is keyed by means of the key 281 to the drive shaft 130 and is located by the dog point set screw 282.

Attached to this driving drum 280 is the driving cam 283. This driving cam 283 comprises a circular ring and is provided with three V-shaped notches 284. Two spaced driving plates 285, 286 are secured to the hub of the pinion 133 and these driving plates 285, 286 have three radial slots 288 and six transverse short horizontal elongated slots 289.

A roller 290 on a pin 292 rests in each of the notches 284 of the driving cam 283. Toggle links 293 fit over each of the pins 292; the other ends of the toggle links 293 carrying pins 295 which engage the short transversely elongated slots 289. Extension springs 300 connect these latter pins 295 on the ends of the toggle links 293 whereby the tension of these extension springs through the toggle links 293 press the roller 290 into the notches 284 of the driving cam 283.

However, if the torque exceeds a certain amount depending upon the strength of the springs 300, and whenever this torque is exceeded, the rollers 290 will begin to climb up the inclines defining the notches of the driving ring cam 283 and then will reach a location wherein the toggles no longer form an angle less than 180° but will actually pass through a straight line and then bend in the opposite direction, passing through center; then, of course, the tension of the springs 300 will make the rollers 290 snap over to the other side of the cam 283 and the driving power is then completely disengaged from the drive shaft 130.

One link 293a of each of the three sets of toggle links is provided with an extension 293b. These extensions will project beyond the periphery of the driving cam 283 whenever the driving rollers 290 have become disengaged and one of these extensions will strike lug 302 of the brake spreader 273 so as to disengage it from the rollers 274 of the brake shoes 253 thereby applying the brake and stopping all motion.

Whenever this disengagement occurs, the operator should then locate the cause of such disengagement which might be due to the knife being too dull, a frozen bearing, or some other difficulty. The overload device after examination of the machine can be re-engaged by depressing the tails or extensions 293b of links 293a and again forcing the driving rollers 290 into the pockets or notches 284 of the driving cam 283.

SUMMARY OF OPERATION

My novel paper cutter is thus so arranged that it includes a clamping mechanism which may be foot operated or power operated, and more particularly a clamping mechanism which is operated to exert pressure proportional to the load encountered by the knife in going through the stack. Thus instead of requiring an adjustment by the operator based solely on the operator's judgment, a compression spring provides for initial clamping pressure of minimum amount and the final clamping pressure is provided and automatically adjusted in accordance with the quality of material, the dullness of the knife and the height of the pile. An adjustment is also provided for the initial spring biased clamping pressure.

My novel paper cutter also includes a simplified knife construction with simple and readily accessible adjustable means for maintaining the knife blade parallel at all times. Specific separate guide members are also included both for the knife and for the clamp so that these elements are always under perfect control.

The guide means for the clamp include a rectangular tubular guide located in the auxiliary housings at the top of the machine; this guide being open at its inner face above the working level of the machine in order to permit the clamp extension to enter the guide on each side. The guide is fully enclosed in the working area of the machine to prevent the pull bars or other operating elements of the clamp from affecting the paper and also to prevent the lodging of paper in the guides. This enclosed area extends up almost, but just short of, the uppermost level of the clamping surface of the clamp when it is raised. The guide is itself provided with substantial openings at a portion thereof facing away from the table in order to permit inspection of the operation of the pull bars and counterbalancing springs on each side and in order to facilitate cleaning thereof without dismantling the machine.

The knife guide members are adjustable in order to align the knife blade vertically in proper operating position. Thus the eccentric pin 89 of Figure 1 is utilized to adjust the knife with respect to a tilt or canting in a vertical plane, while the guide elements of Figure 9 on each side are arranged to adjust the knife with respect to movement of the edge thereof in a horizontal plane to adjust this edge so that the entire knife blade is perfectly vertical.

The driving mechanism is integrated with both the operating mechanism for the clamp and the operating mechanism for the knife in order that these operations proceed in proper sequential timing. The clamp is brought down and initially squeezes the paper by means of the initial bias provided by spring 70. As the knife descends, the reaction of the knife driving elements to the load encountered by the knife in going through the paper drives the clamp further into pressure engagement with the stack, the degree of pressure being determined by the load which the knife must overcome in going through the paper stack.

The driving mechanism is also integrated and controlled by a clutch operating mechanism with a two-hand throw-in mechanism for the clutch for purposes of safety—that is, to occupy both the operator's hands during the time the knife descends.

My paper cutter is also provided with a novel safety pin mechanism to prevent a repeat operation thereby further protecting the operator against any possibility that the knife will descend while he is removing a portion of a cut pile.

My paper cutter is also provided with a novel brake mechanism which will automatically halt the knife in its operation or release it for operation simultaneously with the operation of the clutch member.

Finally and owing to the fact that the full clamping pressure is determined by the load encountered by the knife and that this pressure constantly increases as the knife becomes more and more dull, I provide an overload release mechanism which will halt the operation of the knife when the load encountered by the knife in going through the paper becomes so great as to approach a condition in which some of the connecting or driving elements may break. My clamp operating mechanism is so arranged that the clamp is automatically adjusted to greater pressure as the knife becomes more and more dull and the machine may be continued in operation even when the knife has been dulled to a point which would have made operation of prior machines impossible. The overload release mechanism thus becomes necessary to give a positive indication to the operator that his knife has been dulled to such a point that sharpening thereof is essential.

In operation, a pile of paper is placed on the bed or cutting table 13 and is appropriately adjusted so that the line of cut is directly under the knife blade 86. The operator may then depress the foot pedal 34 to bring down the clamp in order to press the paper pile down temporarily to make sure that the line of cut is just ahead of the clamp and just beneath the knife edge. He then removes his foot from pedal 34. The pedal is then returned by the spring 43 and the clamp is returned to its upper position by the counterbalancing springs 33. He then operates handles 152 and 190 of Figure 13 simultaneously. Handle 190 releases the mechanism for operation and handle 152 actually performs the operation of inter-engaging the clutch elements of the flywheel clutch 135. This connects the driven pulley 138 through the fly-wheel clutch 135 to the main drive shaft 130 and the clamp is then brought down on to the paper pile being pressed into engagement as above described under the influence and control of compression spring 70. The knife 87 is brought down immediately after the clamp 14 and begins to go through the paper.

As previously described, the reaction of the knife blade to the load which is encountered in going through the paper is carried back to the clamp operating mechanism to cause the clamp to press more tightly in proportion to the load. In the event that the load encountered by the driving elements becomes too great owing to progressive dulling of the knife, then the overload release mechanism shown in Figures 16 and 17 disconnects the driving elements and brings the machine to a stop.

In the foregoing, I have described my invention solely in connection with preferred illustrative embodiments thereof. Since many variations and modifications of my invention will now be apparent to those skilled in the art, I prefer to be bound not by the specific disclosures herein contained but only by the appended claims.

I claim:

1. In a paper cutter having a horizontal table to support a stack of paper to be cut, a clamp and knife placed forward of said clamp, said clamp and knife being mounted above said table and moving down toward said table for cutting and up away from said table at the end of the cutting stroke; operating means for said knife and operating means for said clamp, and an additional connection between the operating means for the knife and the operating means for the clamp to transmit to the clamp a downward force thereon proportional to the resistance encountered by the knife in entering and going through the paper stack.

2. In a paper cutter having a horizontal table to support a stack of paper to be cut, a clamp and a knife placed forward of said clamp, said clamp and knife being mounted above said table and moving down toward said table for cutting and up away from said table at the end of the cutting stroke; means for operating said clamp and knife to cause said clamp to engage said paper stack and said knife to cut through said paper stack; and means interconnecting said knife and said clamp to vary the pressure of said clamp on said paper stack in accordance with the resistance encountered by the knife in entering and cutting through said paper stack; and additional means for applying an additional minimum clamping pressure to said clamp.

3. In a paper cutter having a horizontal table to support a stack of paper to be cut, a clamp and and a knife placed forward of said clamp, said clamp and knife being mounted above said table and moving down toward said table for cutting and up away from said table at the end of the cutting stroke; a source of power; means for operating said clamp and knife; a connection between said operating means and said source of power; and automatic means for increasing the clamping pressure in accordance with the resistance encountered by the knife in going through the paper stack; and overload release means for breaking the connection between said source of power and said operating means when the resistance encountered by the knife exceeds a predetermined amount.

4. In a paper cutter having a horizontal table to support a stack of paper to be cut, a clamp and a knife placed forward of said clamp, said clamp and knife being mounted above said table and moving down toward said table for cutting and up away from said table at the end of the cutting stroke; a source of power; means for operating said clamp and knife; a connection between said operating means and said source of power; and overload release means for breaking the connection between said source of power and said operating means when the resistance encountered by the knife exceeds a predetermined amount.

5. In a paper cuter having a work supporting member; a vertically reciprocable clamp; a lateral extension from said clamp; a pull bar connected at its upper end to said lateral extension; a bell crank lever; the lower end of said pull bar being connected to one arm of said bell crank lever; a foot treadle; a connection from said foot treadle to the other arm of said bell crank lever; said bell crank being rotated to pull down said pull bar and clamp when said treadle is depressed; additional means for operating said clamp to lower the same; the connection between said foot treadle and said bell crank lever being broken when said clamp is lowered by said additional means.

6. In a paper cutter having a work supporting member; a vertically reciprocable clamp; a lateral extension from said clamp; a pull bar connected at its upper end to said lateral extension; a bell crank lever; the lower end of said pull bar being connected to one arm of said bell crank lever; a foot treadle; a flexible member connected at one end to said foot treadle; means for yieldingly supporting the opposite end of said flexible member; said flexible member being moved longitudinally when said foot treadle is depressed; an abutment on said flexible member aligned with the other arm of said bell crank lever; said abutment engaging said other arm and rotating said bell crank lever when the foot treadle is depressed to pull down said pull bar and clamp.

7. In a paper cutter having a work supporting member; a vertically reciprocable clamp; a lateral extension from said clamp; a pull bar connected at its upper end to said lateral extension; a bell crank lever; the lower end of said pull bar being connected to one arm of said bell crank lever; a foot treadle; a flexible member connected at one end to said foot treadle; means for yieldingly supporting the opposite end of said flexible member; said flexible member being moved longitudinally when said foot treadle is depressed; an abutment on said flexible member aligned with the other arm of said bell crank lever; said abutment engaging said other arm and rotating said bell crank lever when the foot treadle is depressed to pull down said pull bar and clamp; said means for yieldingly supporting the opposite end of said flexible member returning said flexible member and said foot treadle to the original position when the foot treadle is released.

8. In a paper cutter having a work supporting member; a vertically reciprocable clamp; a lateral extension from said clamp; a pull bar connected at its upper end to said lateral extension; a bell crank lever; the lower end of said pull bar being connected to one arm of said bell crank lever; a foot treadle; a member connected at one end to said foot treadle; means for yieldingly supporting the opposite end of said member; said member being moved longitudinally when said foot treadle is depressed; an abutment on said member aligned with the other arm of said bell crank lever; said abutment engaging said other arm and rotating said bell crank lever when the foot treadle is depressed to pull down said pull bar and clamp; said means for yieldingly supporting the opposite end of said member returning said member and said foot treadle to the original position when the foot treadle is released.

9. In a paper cutter having a work supporting member; a vertically reciprocable clamp; a lateral extension from said clamp; a pull bar connected at its upper end to said lateral extension; a bell crank lever; the lower end of said pull bar being connected to one arm of said bell crank lever; a foot treadle; a flexible member connected at one end to said foot treadle; means for yieldingly supporting the opposite end of said flexible member; said flexible member being moved longitudinally when said foot treadle is depressed; an abutment on said flexible member aligned with the other arm of said bell crank lever; said abutment engaging said other arm and rotating said bell crank lever when the foot treadle is depressed to pull down said pull bar and clamp; additional means for operating the clamp to lower the same; said bell crank lever rotating free of said abutment under the influence of said additional means.

10. In a paper cutter, a table for supporting a stack of paper to be cut, a clamp mounted above the table and means for moving said clamp toward the table to press down the paper stack and for returning said clamp to raised position, said means including a pull bar; a lateral extension from the side of the clamp; said pull bar being connected to said extension; said extension being elevated above the lower face of the clamp by a distance greater than the maximum working stroke of the clamp from its uppermost position to the table; a guide for said extension; said guide including a vertical member of substantially U-shaped cross-section mounted at the side of the table with the open side of the U toward the table and receiving said extension; an opening in said U-shaped member at a portion thereof spaced from said open side of the U; the interior of said U-shaped member being visible through said opening.

11. In a paper cutter, a table for supporting a stack of paper to be cut, a clamp mounted above the table and means for moving said clamp toward the table to press down the paper stack and for returning said clamp to raised position, said means including a pull bar; a lateral extension from the side of the clamp; said pull bar being connected to said extension; a guide for said extension; said guide including a vertical member of substantially U-shaped cross-section mounted at the side of the table with the open side of the U toward the table and receiving said extension; an opening in said U-shaped member at a portion thereof spaced from said open side of the U; the interior of said U-shaped member being visible through said opening.

12. In a paper cutter, a table for supporting a stack of paper to be cut, a clamp mounted above the table and means for moving said clamp toward the table to press down the paper stack and for returning said clamp to raised position, said means including a pull bar; a lateral extension from the side of the clamp; said pull bar being connected to said extension; said extension being elevated above the lower face of the clamp by a distance greater than the maximum working stroke of the clamp from its uppermost position to the table; a guide for said extension; said guide including a vertical member of substantially U-shaped cross-section mounted at the side of the table with the open side of the U toward the table and receiving said extension; an opening in said U-shaped member at a portion thereof spaced from said open side of the U; the interior of said U-shaped member being visible through said opening; the open side of said U-shaped member being closed substantially in the working area of the clamp between the uppermost position of the lower face of the clamp and the table.

13. In a paper cutter, a table for supporting a stack of paper to be cut, a clamp mounted above the table and means for moving said clamp toward the table to press down the paper stack and for returning said clamp to raised position, said means including a pull bar; a lateral extension from the side of the clamp; said pull bar being connected to said extension; said extension being elevated above the lower face of the clamp by a distance greater than the maximum working stroke of the clamp from its uppermost position to the table; a guide for said extension; said guide including a vertical member of substantially U-shaped cross-section mounted at the side of the table with the open side of the U toward the table and receiving said extension; an opening in said U-shaped member at a portion thereof spaced from said open side of the U; the interior of said U-shaped member being visible through said opening; said pull bar being housed in said U-shaped member.

14. In a paper cutter, a table for supporting a stack of paper to be cut, a clamp mounted above the table and means for moving said clamp toward the table to press down the paper stack and for returning said clamp to raised position, said means including a pull bar; a lateral extension from the side of the clamp; said pull bar being connected to said extension; said extension being elevated above the lower face of the clamp by a distance greater than the maximum working stroke of the clamp from its uppermost position to the table; a guide for said extension; said guide including a vertical member of substantially U-shaped cross-section mounted at the side of the table with the open side of the U toward the table and receiving said extension; an opening in said U-shaped member at a portion thereof spaced from said open side of the U; the interior of said U-shaped member being visible through said opening; spring counterbalancing means connected to said extension; said pull bar and said spring counter-balancing means being housed in said U-shaped member.

15. In a paper cutter, a table for supporting a stack of paper to be cut, a clamp mounted above the table and means for moving said clamp toward the table to press down the paper stack and for returning said clamp to raised position, said means including a pull bar; a lateral extension from the side of the clamp; said pull bar being connected to said extension; said extension being elevated above the lower face of the clamp by a distance greater than the maximum working stroke of the clamp from its uppermost position to the table; a guide for said extension; said guide including a vertical member of substantially U-shaped cross-section mounted at the side of the table with the open side of the U toward the table and receiving said extension; an opening in said U-shaped member at a portion thereof spaced from said open side of the U; the interior of said U-shaped member being visible through said opening; the open side of said U-shaped member being closed from the table up to a point below the uppermost position of the lower face of the clamp.

16. In a paper cutter having a work supporting member; a vertically reciprocable clamp; a substantially vertical pull bar connected at its upper end to the clamp; a substantially vertical link; a connection between the lower end of the pull bar and the upper end of the link; operating means for said clamp connected to said link to lower the link and lower the clamp; said operating means including a rotatable member, a pinion driven by said rotatable member, a gear drven by said pinion, a crank pin on said gear, said crank pin being connected to the lower end of said link.

17. In a paper cutter having a work supporting table; a vertically reciprocable clamp; a substantially vertical pull bar connected at its upper end to the clamp; a substantially vertical link; a connection between the lower end of the pull bar and the upper end of the link; operating means for said clamp connected to said link to lower the link and lower the clamp; said operating means including a rotatable member, a pinion driven by said rotatable member, a gear driven by said pinion, a crank pin on said gear, said crank pin being connected to the lower end of said link; said connection between the upper end of the link and the pull bar being arranged to permit said link to rise while said clamp and pull bar are in lowered position and additional means for raising said clamp.

18. In a paper cutter having a work supporting table; a vertically reciprocable clamp; a substantially vertical pull bar connected at its upper end to the clamp; a substantially vertical link; a connection between the lower end of the pull bar and the upper end of the link; operating means for said clamp connected to said link to lower the link and lower the clamp; said operating means including a rotatable member; a pinion driven by said rotatable member, a gear driven by said pinion, a crank pin on said gear, said crank pin being connected to the lower end of said link; said connection between the upper end of the link and the pull bar comprising a pin connected to the lower end of the pull bar; a vertical slot in the upper end of the link; the upper end of said slot bearing on said pin when the link is lowered by said crank pin; said slot permitting the link to return to its upper position while said clamp and pull bar are in lowered position; and additional means for raising said clamp.

19. In a paper cutter having a table for supporting a paper stack; a vertically reciprocable clamp; a substantially vertical pull bar connected at its upper end to the clamp; a substantially vertical link; a connection between the lower end of the pull bar and the upper end of the link; operating means for said clamp connected to said link to lower the link and lower the clamp; said operating means including a rotatable member, a pinion driven by said rotatable member, a gear driven by said pinion, a crank pin on said gear, said crank pin being connected to the lower end of said link; a rotatable plate concentric with said pinion and parallel to said gear; said gear being rotatably mounted on said rotatable plate; said rotatable plate remaining stationary until the clamp engages the paper stack; said rotatable plate thereafter rotating in the direction of rotation of the gear until the crank pin on the gear, the center of rotation of the gear and the point of connection between the link and the pull bar are aligned.

20. In a paper cutter having a table for supporting a paper stack; a vertically reciprocable clamp; a substantially vertical pull bar connected at its upper end to the clamp; a substantially vertical link; a connection between the lower end of the pull bar and the upper end of the link; operating means for said clamp connected to said link to lower the link and lower the clamp; said operating means including a rotatable member, a pinion driven by said rotatable member, a gear driven by said pinion, a crank pin on said gear, said crank pin being connected to the lower end of said link; a rotatable plate concentric with said pinion and parallel to said gear; said gear being rotatably mounted on said rotatable plate; said rotatable plate remaining stationary until the clamp engages the paper stack; said rotatable plate thereafter rotating in the direction of rotation of the gear until the crank pin on the gear, the center of rotation of the gear and the point of connection between the link and the pull bar are aligned; said rotatable plate thereafter, on continued rotation of said rotatable member, returning to its original position and said gear thereafter continuing its rotation to return said crank pin and said link to the original raised position.

21. In a paper cutter having a table for supporting a paper stack; a vertically reciprocable clamp; a substantially vertical pull bar connected at its upper end to the clamp; a substantially vertical link; a connection between the lower end of the pull bar and the upper end of the link; operating means for said clamp connected to said link to lower the link and lower the clamp; said operating means including a rotatable member, a pinion driven by said rotatable member, a gear driven by said pinion, a crank pin on said gear, said crank pin being connected to the lower end of said link; a rotatable plate concentric with said pinion and parallel to said gear; said gear being rotatably mounted on said rotatable plate; said rotatable plate remaining stationary until the clamp engages the paper stack; said rotatable plate thereafter rotating in the direction of rotation of the gear until the crank pin on the gear, the center of rotation of the gear and the point of connection between the link and the pull bar are aligned; and a compression spring connected to said rotatable plate; said rotatable plate compressing said spring when rotating; the compression of said spring determining the initial pressure of said clamp on said paper stack.

22. In a paper cutter, a vertically reciprocable clamp; a substantially vertical pull bar connected at its upper end to the clamp; a substantially vertical link, a connection between the lower end of the pull bar and the upper end of the link; operating means for said clamp connected to said link to lower the link and lower the clamp; said operating means including a rotatable member, a pinion driven by said rotatable member, a gear driven by said pinion, a crank pin on said gear, said crank pin being connected to the lower end of said link; a rotatable plate concentric with said pinion and parallel to said gear; said gear being rotatably mounted on said rotatable plate; said rotatable plate remaining stationary until the clamp engages the paper stack; said rotatable plate thereafter rotating in the direction of rotation of the gear until the crank pin on the gear, the center of rotation of the gear and the point of connection between the link and the pull bar are aligned; a vertically reciprocable knife; drive mechanism for said knife; said drive mechanism including said first mentioned rotatable member; and an independent connection between said rotatable member and said rotatable plate, said independent connection being responsive to the resistance encountered by the knife to increase clamping pressure in accordance therewith.

23. In a paper cutter, a vertically reciprocable clamp; a substantially vertical pull bar connected at its upper end to the clamp; a substantially vertical link; a connection between the lower end of the pull bar and the upper end of the link; operating means for said clamp connected to said link to lower the link and lower the clamp; said operating means including a rotatable driving member integral with first and second pinions, a freely rotatable plate concentric with said rotatable driving member, a gear journalled on said plate and meshing with the first pinion, a crank pin on said gear, said crank pin being connected to the lower end of said link; said rotatable plate remaining stationary until the clamp engages the paper stack; and thereafter said plate rotates to bring about the condition wherein the crank pin on the gear, the center of rotation of the gear and the point of connection between the link and the pull bar are aligned; a vertically reciprocable knife; drive mechanism for said knife; said drive mechanism including an internal gear and said first mentioned rotatable driving member and said second pinion; a shaft connected to said plate, a pinion journalled on said shaft and meshing with said second pinion and said internal gear, whereby the torque reaction of the knife driving mechanism is transmitted to said shaft and restrains the rotation of said plate and thereby increases the clamping pressure in accordance therewith.

24. In a paper cutter having a table to support a paper stack, a vertically reciprocable knife and a vertically reciprocable clamp; a rotatable driving member; clamp driving elements for lowering the clamp into pressure engagement with said paper stack; a connection between said rotatable driving member and said clamp driving elements; knife driving elements for lowering the knife and driving it through said paper stack; a connection between said rotatable driving member and said knife driving elements; and an additional connection from said rotatable driving member to said clamp driving elements, said additional connection being responsive to the resistance encountered by the knife in going through the paper stack to increase clamping pressure in accordance therewith.

25. In a paper cutter having a table to support a paper stack, a vertically reciprocable knife and a vertically reciprocable clamp; a rotatable driving member; clamp driving elements for lowering the clamp into pressure engagement with said paper stack; a connection between said rotatable driving member and said clamp driving elements; said connection including a rotatable plate and a compression spring resisting the rotation of said rotatable plate to establish initial clamping pressure; knife driving elements for lowering the knife and driving it through said paper stack; a connection between said rotatable driving member and said knife driving elements; and an additional gear connection from said rotatable driving member to said clamp driving elements, said additional connection being responsive to the resistance encountered by the knife in going through the paper stack to restrain said rotatable plate to increase clamping pressure in accordance therewith.

26. In a paper cutter having a table to support a paper stack; a vertically reciprocable knife and a vertically reciprocable clamp; a rotatable driving member; clamp driving elements for lowering the clamp into pressure engagement with said paper stack; a connection between said rotatable driving member and said clamp driving elements; said connection including a freely rotatable plate; a gear rotatably carried by said plate planetary to said rotatable driving member and driven thereby; a spring resisting movement of said plate in response to rotation of said planetary gear; knife driving elements for lowering the knife and driving it through said paper stack; a connection between said rotatable driving member and said knife driving elements; and an additional planetary gear connection from said rotatable driving member to said plate including an additional gear rotatably mounted on said plate; said additional planetary gear connection being responsive to the torque of the rotatable driving member due to the resistance encountered thereby in driving the knife through the paper stack to move the plate to increase clamping pressure in accordance with said torque.

27. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; a cam engaging said roller; a rotatable operating lever secured to said cam; movement of said operating lever and cam in one direction moving said shaft axially to engage said clutch and movement thereof in an opposite direction moving said shaft axially in the opposite direction to disengage said clutch.

28. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; said roller being rotatable on an axis normal to said shaft; a cam having parallel walls engaging opposite portions of said roller; a rotatable operating lever secured to said cam; movement of said operating lever and cam in one direction moving said shaft axially to engage said clutch and movement thereof in an opposite direction moving said shaft axially in the opposite direction to disengage said clutch.

29. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; said roller being barrel shaped and rotatable on an axis normal to said shaft, a cam having parallel walls engaging opposite portions of said roller; an operating lever secured to said cam; said cam and operating lever being rotatable in a plane normal to the axis of said shaft; movement of said operating lever and cam in one direction moving said shaft axially to engage said clutch and movement thereof in an opposite direction moving said shaft axially in the opposite direction to disengage said clutch.

30. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; said roller being barrel shaped and rotatable on an axis normal to said shaft, a cam having parallel walls engaging opposite portions of said roller; an operating lever secured to said cam; said cam and operating lever being rotatable in a plane normal to the axis of said shaft; said cam walls being inclined to the plane of rotation of said cam and operating lever; movement of said operating lever and cam in one direction moving said shaft axially to engage said clutch and movement thereof in an opposite direction moving said shaft axially in the opposite direction to disengage said clutch.

31. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; said roller being rotatable on an axis normal to said shaft; a channel shaped cam engaging opposite portions of said roller; an operating lever secured to said cam; said cam and operating lever being rotatable in a plane normal to the axis of said shaft; movement of said operating lever and cam in one direction moving said shaft axially to engage said clutch and movement thereof in an opposite direction moving said shaft axially in the opposite direction to disengage said clutch.

32. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; a cam engaging said roller; a rotatable operating lever secured to said cam; movement of said operating lever and cam in one direction moving said shaft axially to engage said clutch and movement thereof in an opposite direction moving said shaft axially in the opposite direction to disengage said clutch; said operating lever being manually operable in at least one direction to engage said clutch; and automatic means for moving said operating lever in the clutch disengaging direction at a predetermined portion of the cycle of movement of the vertically reciprocable knife.

33. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; said roller being barrel shaped and rotatable on an axis normal to said shaft, a cam having parallel walls engaging opposite portions of said roller; an operating lever secured to said cam; said cam and operating lever being rotatable in a plane normal to the axis of said shaft; said cam walls being inclined to the plane of rotation of said cam and operating lever; movement of said operating lever and cam in one direction moving said shaft axially to engage said clutch and movement thereof in an opposite direction moving said shaft axially in the opposite direction to disengage said clutch; said operating lever being manually operable in at least one direction to engage said clutch; and automatic means for moving said operating lever in the clutch disengaging direction at a predetermined portion of the cycle of movement of the vertically reciprocable knife.

34. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; a cam engaging said roller; a rotatable operating lever secured to said cam; movement of said operating lever and cam in one direction moving said shaft axially to engage said clutch and movement thereof in an opposite direction moving said shaft axially in the opposite direction to disengage said clutch; said operating lever being manually rotatable in at least one direction; a clutch disengaging member carried by the operating means for the knife, said last mentioned member having a cyclical movement corresponding to a cycle of operation of the knife; said clutch disengaging member engaging said operating lever at a predetermined portion of its cycle of movement to rotate said operating lever in the clutch disengaging direction.

35. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; a cam engaging said roller; a rotatable operating lever secured to said cam; movement of said operating lever and cam in one direction moving said shaft axially to engage said clutch and movement thereof in an opposite direction moving said shaft axially in the opposite direction to disengage said clutch; said operating lever being manually rotatable in at least one direction; a clutch disengaging member carried by the opearting means for the knife, said last mentioned member having a cyclical movement corresponding to a cycle of operation of the knife; said clutch disengaging member engaging said operating lever at a predetermined portion of its cycle of movement corresponding to the completion of the upward movement of the knife to rotate said operating lever in the clutch disengaging direction.

36. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; said roller being barrel shaped and rotatable on an axis normal to said shaft, a cam having parallel walls engaging opposite portions of said roller; an operating lever secured to said cam; said cam and operating lever being rotatable in a plane normal to the axis of said shaft; said cam walls being inclined to the plane of rotation of said cam and operating lever; movement of said operating lever and cam in one direction moving said shaft axially to engage said clutch and movement thereof in an opposite direction moving said shaft axially in the opposite direction to disengage said clutch; said operating lever being manually rotatable in at least one direction; a clutch disengaging member carried by the operating means for the knife, said last mentioned member having a cyclical movement corresponding to a cycle of operation of the knife; said clutch disengaging member engaging said operating lever at a predetermined portion of its cycle of movement to rotate said operating lever in the clutch disengaging direction.

37. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; a cam engaging said roller; a rotatable operating lever secured to said cam; movement of said operating lever and cam in one direction moving said shaft axially to engage said clutch and movement thereof in an opposite direction moving said shaft axially in the opposite direction to disengage said clutch; means for manually rotating said operating lever in at least the clutch engaging direction; and a latch member connected to said operating lever and restraining said operating lever against rotation in the clutch engaging direction; independent manually operated means for releasing said latch.

38. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; a cam engaging said roller; a rotatable operating lever secured to said cam; movement of said operating lever and cam in one direction moving said shaft axially to engage said clutch and movement thereof in an opposite direction moving said shaft axially in the opposite direction to disengage said clutch; means for manually rotating said operating lever in at least the clutch engaging direction; and a latch member connected to said operating lever and restraining said operating lever against rotation in the clutch engaging direction; independent manually operated means for releasing said latch; said latch being releasable by said last mentioned independent manually operated means only when said first mentioned manual operating means is actuated.

39. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; an axially movable shaft; said lever being secured to said shaft; a roller at one end of said shaft; a cam engaging said roller; a rotatable operating lever secured to said cam; movement of said operating lever and cam in one direction moving said shaft axially to engage said clutch and movement thereof in an opposite direction moving said shaft axially in the opposite direction to disengage said clutch; means for manually rotating said operating lever in at least the clutch engaging direction; and a latch member connected to said operating lever and restraining said operating lever against rotation in the clutch engaging direction; independent manually operated means for releasing said latch; said latch being releasable by said last mentioned independent manually operated means only when said first mentioned manual operating means is actuated; the engagement of the clutch requiring a simultaneous operation by two hands.

40. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; safety mechanism for preventing repeat operation of the knife on completion of one down and up cycle; said safety mechanism including a pin on said lever movable therewith, said pin being yieldingly secured to said lever; said operating means for the knife including a cyclically operable member rotatable once for each cycle of the knife; said last mentioned member carrying a projection; said pin extending in the path of the projection when the clutch is disengaged and being removed from the path thereof when the clutch is engaged; and means operable before the completion of each cycle for moving said pin with respect to said lever against the bias of its yielding securement back to a position where it is interposed in the path of movement of the projection.

41. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; safety mechanism for preventing repeat operation of the knife on completion of one down and up cycle; said safety mechanism including a pin on said lever movable therewith, said pin being yieldingly secured to said lever; said operating means for the knife including a cyclically operable member rotatable once for each cycle of the knife; said last mentioned member carrying a projection; said pin extending in the path of the projection when the clutch is disengaged and being removed from the path thereof when the clutch is engaged; and a cam member rotatable cyclically simultaneously with said cyclically operable member; a lateral extension from said pin; said cam engaging said extension from said pin before the end of each cycle and moving said pin with respect to said lever against the bias of its yielding securement back to a position where it is interposed in the path of movement of the projection.

42. In a paper cutter, a vertically reciprocable cutting knife, operating means for lowering and raising the knife, a power drive for said operating means and a clutch connection between said power drive and said operating means; means for engaging and disengaging said clutch; said means comprising a clutch engaging lever; movement of said lever in one direction engaging the clutch and movement thereof in the opposite direction disengaging the clutch; safety mechanism for preventing repeat operation of the knife on completion of one down and up cycle; said safety mechanism including a pin on said lever movable therewith, said pin being also movable with respect to said lever; said operating means for the knife including a cyclically operable member rotatable once for each cycle of the knife; said last mentioned member carrying a projection; said pin extending in the path of the projection when the clutch is disengaged and being removed from the path thereof when the clutch is engaged; and means operable before the completion of each cycle for moving said pin with respect to said lever back to a position where it is interposed in the path of movement of the projection.

43. In a paper cutter, a vertically reciprocable cutting knife, operating means for lowering and raising the knife, a power drive for said operating means and a clutch connection between said power drive and said operating means; means for engaging and disengaging said clutch; said means comprising a clutch engaging lever; movement of said lever in one direction engaging the clutch and movement thereof in the opposite direction disengaging the clutch; safety mechanism for preventing repeat operation of the knife on completion of one down and up cycle; said safety mechanism including a pin on said lever movable therewith, said pin being also movable with respect to said lever; said operating means for the knife including a cyclically operable member rotatable once for each cycle of the knife; said last mentioned member carrying a projection; said pin extending in the path of the projection when the clutch is disengaged and being removed from the path thereof when the clutch is engaged; and means operable before the completion of each cycle for moving said pin with respect to said lever back to a position where it is interposed in the path of movement of the projection; and latch means for thereafter engaging said pin and holding it in interposing position while said clutch is engaged.

44. In a paper cutter, a vertically reciprocable cutting knife, operating means for lowering and raising the knife, a power drive for said operating means and a clutch connection between said power drive and said operating means; means for engaging and disengaging said clutch; said means comprising a clutch engaging lever; movement of said lever in one direction engaging the clutch and movement thereof in the opposite direction disengaging the clutch; safety mechanism for preventing repeat operation of the knife on completion of one down and up cycle; said safety mechanism including a pin on said lever movable therewith, said pin being also movable with respect to said lever; said operating means for the knife including a cyclically operable member rotatable once for each cycle of the knife; said last mentioned member carrying a projection; said pin extending in the path of the projection when the clutch is disengaged and being removed from the path thereof when the clutch is engaged; and means operable before the completion of each cycle for moving said pin with respect to said lever back to a position where it is interposed in the path of movement of the projection; and latch means for thereafter engaging said pin and holding it in interposing position while said clutch is engaged; and means operable on movement of said lever to clutch disengaging position to release said latch.

45. In a paper cutter, a vertically reciprocable cutting knife, operating means for lowering and raising the knife, a power drive for said operating means and a clutch connection between said power drive and said operating means; means for engaging and disengaging said clutch; said means comprising a clutch engaging lever; movement of said lever in one direction engaging the clutch and movement thereof in the opposite direction disengaging the clutch; safety mechanism for preventing repeat operation of the knife on completion of one down and up cycle; said safety mechanism including a pin on said lever movable therewith, said pin being also movable with respect to said lever; said operating means for the knife including a cyclically operable member rotatable once for each cycle of the knife; said last mentioned member carrying a projection; said pin extending in the path of the projection when the clutch is disengaged and being removed from the path thereof when the clutch is engaged; and means operable before the completion of each cycle for moving said pin with respect to said lever back to a position where it is interposed in the path of movement of the projection; and additional means for preventing engagement of said pin and said projection while said operating means for the knife is being "inched" intermittently by the operator.

46. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging lever; movement of said lever in one direction engaging the clutch and movement thereof in the opposite direction disengaging the clutch; safety mechanism for preventing repeat operation of the knife on completion of one down and up cycle; said safety mechanism including a pin on said lever movable therewith, said pin being yieldingly secured to said lever; said operating means for the knife including a cyclically operable member rotatable once for each cycle of the knife; said last mentioned member carrying a projection; said pin extending in the path of the projection when the clutch is disengaged and being removed from the path thereof when the clutch is engaged; and a cam member rotatable cyclically simultaneously with said cyclically operable member; a lateral extension from said pin; said cam engaging said extension from said pin before the end of each cycle and moving said pin with respect to said lever against the bias of its yielding securement back to a position where it is interposed in the path of movement of the projection; and latch means for thereafter engaging said pin and holding it in interposing position while said clutch is engaged.

47. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging member; movement of said member in one direction engaging the clutch and movement of said member in the opposite direction disengaging the clutch; a brake member on said operating means; a brake shoe biased into engagement therewith; an arm carried by said clutch operating member; said arm engaging said brake shoe and moving it out of engagement with said brake member when said clutch operating member is moved to clutch engaging position.

48. In a paper cutter, a vertically reciprocable cutting knife, operating means for lowering and raising the knife, a power drive for said operating means and a clutch connection between said power drive and said operating means; means for engaging and disengaging said clutch, said means comprising a clutch engaging member; movement of said member in one direction engaging the clutch and movement of said member in the opposite direction disengaging the clutch; a brake member on said operating means; a brake shoe biased into engagement therewith; an arm carried by said clutch operating member; said arm engaging said brake shoe and moving it out of engagement with said brake member when said clutch operating member is moved to clutch engaging position; said arm permitting said brake shoe to engage said brake member when said clutch operating member is moved to clutch disengaging position.

49. In a paper cutter having a horizontal table to support a stack of paper to be cut, a clamp and a knife placed forward of said clamp, said clamp and knife being mounted above said table and moving down toward said table for cutting and up away from said table at the end of the cutting stroke; a source of power; means for operating said clamp and knife; a connection between said operating means and said source of power; and overload release means for breaking the connection between said source of power and said operating means when the resistance encountered by the knife exceeds a predetermined amount, said overload release means comprising a driving cam and a driven member; links on said driven member; spring means biasing said links into engagement with said cam; said spring means being responsive to the relative torque between said driving cam and said driven member to permit a release of said links from said cam at a predetermined load.

50. In a paper cutter; a vertically reciprocable knife; operating means for the knife; a source of power; and a connection between said source of power and said operating means; said connection including overload release means responsive to an excess load to disconnect said knife operating means from said source of power; said overload release means comprising a driving member and a driven member; a cam on one of said members; an internal substantially V-shaped notch in said cam; a toggle on the other of said members; the center of said toggle carrying a roller registering in said notch; tension spring means converting the ends of said toggle and maintaining said roller in said notch.

51. In a paper cutter; a vertically reciprocable knife; operating means for the knife; a source of power, and a connection between said source of power and said operating means; said connection including overload release means responsive to an excess load to disconnect said knife operating means from said source of power; said overload release means comprising a driving member and a driven member; a cam on one of said members; an internal substantially V-shaped notch in said cam; a toggle on the other of said members; the center of said toggle carrying a roller registering in said notch; tension spring means connecting the ends of said toggle and maintaining said roller in said notch, the torque between said members tending to straighten said toggle and drive said roller out of said notch against the bias of said spring.

52. In a paper cutter; a vertically reciprocable knife; operating means for the knife; a source of power; and a connection between said source of power and said operating means; said connection including overload release means responsive to an excess load to disconnect said knife operating means from said source of power; said overload release means comprising a driving member and a driven member; a cam on one of said members; an internal substantially V-shaped notch in said cam; a toggle on the other of said members; the center of said toggle carrying a roller registering in said notch; tension spring means connecting the ends of said toggle and maintaining said roller in said notch, the torque between said members tending to straighten said toggle and drive said roller out of said notch against the bias of said spring, said toggle being straightened and driven through center when said torque reaches a predetermined extent.

53. In a paper cutter; a vertically reciprocable knife; operating means for the knife; a source of power; and a connection between said source of power and said operating means; said connection including overload release means responsive to an excess load to disconnect said knife operating means from said source of power; said overload release means comprising a driving member and a driven member; a cam on one of said members; an internal substantially V-shaped notch in said cam; a toggle on the other of said members; the center of said toggle carrying a roller registering in said notch; tension spring means connecting the ends of said toggle and maintaining said roller in said notch, the torque between said members tending to straighten said toggle and drive said roller out of said notch against the bias of said spring, said toggle being straightened and driven through center when said torque reaches a predetermined extent, the roller being thereby snapped out of said notch and thereby disconnecting said driving and driven members.

54. In a paper cutter; a vertically reciprocable knife; operating means for the knife; a source of power; and a connection between said source of power and said operating means; said connection including overload release means responsive to an excess load to disconnect said knife operating means from said source of power; said overload release means comprising a driving member and a driven member; a cam on one of said members; an internal substantially V-shaped notch in said cam; a toggle on the other of said members; the center of said toggle carrying a roller registering in said notch; tension spring means connecting the ends of said toggle and maintaining said roller in said notch, the torque between said members tending to straighten said toggle and drive said roller out of said notch against the bias of said spring, said toggle being straightened and driven through center when said torque reaches a predetermined extent, the roller being thereby snapped out of said notch and thereby disconnecting said driving and driven members, at least one of the links of said toggle being extended and manually engageable to push the toggle back through center to re-engage the roller in the notch.

55. In a paper cutter; a vertically reciprocable knife; operating means for the knife; a source of power; and a connection between said source of power and said operating means; said connection including overload release means responsive to an excess load to disconnect said knife operating means from said source of power; said overload release means comprising a driving member and a driven member; a cam on one of said members; a plurality of substantially V-shaped notches in said cam; a plurality of corresponding toggles on the other of said members; the center of each toggle carrying a roller registering in one of the notches; tension spring means connecting the ends of each toggle and maintaining the roller in its notch.

56. In a paper cutter; a vertically reciprocable knife; operating means for the knife; a source of power; and a connection between said source of power and said operating means; said connection including overload release means responsive to an excess load to disconnect said knife operating means from said source of power; said overload release means comprising a driving member and a driven member; a cam on one of said members; a plurality of substantially V-shaped notches in said cam; a plurality of corresponding toggles on the other of said members; the center of each toggle carrying a roller registering in one of the notches; tension spring means connecting the ends of each toggle and maintaining the roller in its notch, the torque between said members tending to straighten said toggle and drive said roller out of said notch against the bias of said spring, said toggle being straightened and driven through center when said torque reaches a predetermined extent, the roller being thereby snapped out of said notch and thereby disconnecting said driving and driven members.

57. In a paper cutter having a work supporting table; a vertically reciprocable clamp; a substantially vertical pull bar connected at its upper end to the clamp; a substantially vertical link; a connection between the lower end of the pull bar and the upper end of the link; operating means for said clamp connected to said link to lower the link and lower the clamp; said operating means including a rotatable member, a pinion driven by said rotatable member, a gear driven by said pinion, a crank pin on said gear, said crank pin being connected to the lower end of said link; said connection between the upper end of the link and the pull bar being arranged to permit said clamp and pull bar to descend when said crank pin is in its uppermost position.

FREDERICK W. SEYBOLD.

REFERENCES CITED

The following references are of record in the file of this patent:

UNITED STATES PATENTS

| Number | Name | Date |
|---|---|---|
| Re. 9,809 | Sheridon | July 19, 1881 |
| 425,519 | Morse | Apr. 15, 1890 |
| 1,504,521 | Seybold | Aug. 12, 1924 |
| 2,127,432 | Seybold | Aug. 16, 1938 |
| 2,329,549 | Mourer | Sept. 14, 1943 |